US008732044B2

(12) United States Patent
Lovelett et al.

(10) Patent No.: US 8,732,044 B2
(45) Date of Patent: May 20, 2014

(54) ELECTRONIC TRANSACTION APPARATUS AND METHOD

(75) Inventors: John M Lovelett, New York, NY (US);
Shari Krikorian, Armonk, NY (US);
Edward F Downs, River Vale, NJ (US);
Julie Kramer, Tarrytown, NY (US);
Alicia Cavallaro, Milford, CT (US);
George Damianov, Stamford, CT (US);
Beza Lemma, New York, NY (US);
Vimal Singh, San Ramon, CA (US)

(73) Assignee: Mastercard International Incorporated, Purchase, NY (US)

( * ) Notice: Subject to any disclaimer, the term of this patent is extended or adjusted under 35 U.S.C. 154(b) by 861 days.

(21) Appl. No.: 11/751,887

(22) Filed: May 22, 2007

(65) Prior Publication Data
US 2007/0282743 A1 Dec. 6, 2007

Related U.S. Application Data

(60) Provisional application No. 60/802,673, filed on May 23, 2006.

(51) Int. Cl.
*G06Q 40/00* (2012.01)
(52) U.S. Cl.
USPC .............................................. 705/35; 705/38
(58) Field of Classification Search
USPC .......................................................... 705/35
See application file for complete search history.

(56) References Cited

U.S. PATENT DOCUMENTS 5,220,501 A 6/1993 Lawlor et al.
5,265,008 A 11/1993 Benton et al.
5,326,959 A 7/1994 Perazza
5,383,113 A 1/1995 Kight et al.
5,465,206 A 11/1995 Hilt et al.
5,483,445 A 1/1996 Pickering (Continued)

FOREIGN PATENT DOCUMENTS

WO WO97/17678 5/1997
WO WO99/03243 1/1999
WO WO2006026418 3/2006

OTHER PUBLICATIONS

Mastercard Payment Gateway, e-P3 ' Downloaded from http://www.mastercard.com/us/business/en/corporate/purchasingsolutions/integration/ep3/paymentgateway.html.

(Continued)

*Primary Examiner* — Bruce I Ebersman
*Assistant Examiner* — John Anderson
(74) *Attorney, Agent, or Firm* — Otterstedt, Ellenbogen & Kammer, LLP

(57) ABSTRACT

One inventive step includes facilitating obtaining a payment file associated with a buyer (for example, directly from the buyer, or from a third party partner). The file includes data specifying a first form of payment from the buyer to a first biller and data specifying a second form of payment, different than the first form of payment, from the buyer to a second biller. Other inventive steps include facilitating appending first stored data to the data specifying the first form of payment to the first biller, to effectuate payment to the first biller by the first form of payment; and facilitating appending second stored data to the data specifying the second form of payment to the second biller, to effectuate payment to the second biller by the second form of payment.

52 Claims, 17 Drawing Sheets

(56) References Cited

U.S. PATENT DOCUMENTS

| | | | |
|---|---|---|---|
| 5,659,165 A | 8/1997 | Jennings et al. | |
| 5,684,965 A | 11/1997 | Pickering | |
| 5,699,528 A | 12/1997 | Hogan | |
| 5,774,553 A | 6/1998 | Rosen | |
| 5,787,402 A | 7/1998 | Potter et al. | |
| 5,850,446 A | 12/1998 | Berger et al. | |
| 5,873,072 A | 2/1999 | Kight et al. | |
| 5,893,080 A | 4/1999 | McGurl et al. | |
| 5,897,621 A | 4/1999 | Boesch et al. | |
| 5,920,847 A | 7/1999 | Kolling et al. | |
| 5,943,656 A | 8/1999 | Crooks et al. | |
| 5,963,647 A | 10/1999 | Downing et al. | |
| 5,970,475 A * | 10/1999 | Barnes et al. | 705/26.35 |
| 5,978,485 A | 11/1999 | Rosen | |
| 5,978,780 A | 11/1999 | Watson | |
| 6,019,282 A | 2/2000 | Thompson et al. | |
| 6,032,133 A | 2/2000 | Hilt et al. | |
| 6,035,285 A | 3/2000 | Schlect et al. | |
| 6,052,671 A | 4/2000 | Crooks et al. | |
| 6,072,870 A | 6/2000 | Nguyen et al. | |
| 6,119,106 A | 9/2000 | Mersky et al. | |
| 6,138,107 A | 10/2000 | Elgamal | |
| 6,205,433 B1 | 3/2001 | Boesch et al. | |
| 6,223,168 B1 | 4/2001 | McGurl et al. | |
| 6,269,345 B1 | 7/2001 | Riboud | |
| 6,304,915 B1 | 10/2001 | Nguyen et al. | |
| 6,311,170 B1 | 10/2001 | Embrey | |
| 6,363,362 B1 | 3/2002 | Burfield et al. | |
| 6,366,893 B2 | 4/2002 | Hannula et al. | |
| 6,408,284 B1 | 6/2002 | Hilt et al. | |
| 6,438,528 B1 | 8/2002 | Jensen et al. | |
| 6,510,451 B2 | 1/2003 | Wu et al. | |
| 6,606,606 B2 | 8/2003 | Starr | |
| 6,807,410 B1 | 10/2004 | Pailles et al. | |
| 6,856,970 B1 | 2/2005 | Campbell et al. | |
| 6,883,004 B2 | 4/2005 | Bahl et al. | |
| 6,892,184 B1 | 5/2005 | Komem et al. | |
| 6,944,595 B1 | 9/2005 | Graser et al. | |
| 6,983,261 B1 | 1/2006 | Francisco et al. | |
| 7,028,008 B2 | 4/2006 | Powar | |
| 7,051,002 B2 | 5/2006 | Keresman et al. | |
| 7,058,612 B2 | 6/2006 | Park et al. | |
| 7,076,465 B1 | 7/2006 | Blagg et al. | |
| 7,089,213 B2 | 8/2006 | Park et al. | |
| 7,107,244 B2 | 9/2006 | Kight et al. | |
| 7,133,844 B2 | 11/2006 | Park et al. | |
| 7,213,003 B1 | 5/2007 | Kight et al. | |
| 7,240,031 B1 | 7/2007 | Kight et al. | |
| 2001/0025265 A1 | 9/2001 | Takayasu | |
| 2001/0044776 A1 | 11/2001 | Kight et al. | |
| 2001/0056390 A1 | 12/2001 | Varadarajan et al. | |
| 2002/0002537 A1 | 1/2002 | Bastiansen | |
| 2002/0023053 A1 | 2/2002 | Szoc et al. | |
| 2002/0032651 A1 | 3/2002 | Embrey | |
| 2002/0038305 A1 | 3/2002 | Bahl et al. | |
| 2002/0055907 A1 | 5/2002 | Pater et al. | |
| 2002/0059113 A1 | 5/2002 | Bahl et al. | |
| 2002/0059114 A1 | 5/2002 | Cockrill et al. | |
| 2002/0062282 A1 | 5/2002 | Kight et al. | |
| 2002/0065773 A1 | 5/2002 | Kight et al. | |
| 2002/0077977 A1 * | 6/2002 | Neely et al. | 705/40 |
| 2002/0099656 A1 | 7/2002 | Wong | |
| 2002/0103752 A1 | 8/2002 | Berger et al. | |
| 2002/0143701 A1 | 10/2002 | Maguire et al. | |
| 2002/0178117 A1 | 11/2002 | Maguire et al. | |
| 2002/0198798 A1 | 12/2002 | Ludwig et al. | |
| 2002/0198828 A1 | 12/2002 | Ludwig et al. | |
| 2002/0198829 A1 | 12/2002 | Ludwig et al. | |
| 2002/0198835 A1 | 12/2002 | Watson | |
| 2003/0004874 A1 | 1/2003 | Ludwig et al. | |
| 2003/0023552 A1 | 1/2003 | Kight et al. | |
| 2003/0105710 A1 | 6/2003 | Barbara et al. | |
| 2003/0130921 A1 | 7/2003 | Force et al. | |
| 2003/0130942 A1 | 7/2003 | Campbell et al. | |
| 2003/0130943 A1 | 7/2003 | Campbell et al. | |
| 2003/0130944 A1 | 7/2003 | Force et al. | |
| 2003/0130945 A1 | 7/2003 | Force et al. | |
| 2003/0145043 A1 | 7/2003 | Matuska | |
| 2003/0163425 A1 | 8/2003 | Cannon | |
| 2003/0167229 A1 | 9/2003 | Ludwig et al. | |
| 2003/0187789 A1 | 10/2003 | Karas et al. | |
| 2003/0187792 A1 | 10/2003 | Hansen et al. | |
| 2003/0204457 A1 | 10/2003 | Arias | |
| 2003/0208440 A1 | 11/2003 | Harada et al. | |
| 2003/0208442 A1 | 11/2003 | Cockrill et al. | |
| 2003/0216990 A1 | 11/2003 | Star | |
| 2003/0220858 A1 | 11/2003 | Lam et al. | |
| 2004/0039699 A1 | 2/2004 | Egendorf | |
| 2004/0049459 A1 | 3/2004 | Philliou et al. | |
| 2004/0064407 A1 | 4/2004 | Kight et al. | |
| 2004/0064408 A1 | 4/2004 | Kight et al. | |
| 2004/0064409 A1 | 4/2004 | Kight et al. | |
| 2004/0064410 A1 | 4/2004 | Kight et al. | |
| 2004/0078329 A1 | 4/2004 | Kight et al. | |
| 2004/0083167 A1 | 4/2004 | Kight et al. | |
| 2004/0083171 A1 | 4/2004 | Kight et al. | |
| 2004/0093269 A1 | 5/2004 | Rubin et al. | |
| 2004/0093305 A1 | 5/2004 | Kight et al. | |
| 2004/0128240 A1 | 7/2004 | Yusin | |
| 2004/0128255 A1 | 7/2004 | Jung | |
| 2004/0143552 A1 | 7/2004 | Weichert et al. | |
| 2004/0167823 A1 | 8/2004 | Neely et al. | |
| 2004/0210520 A1 | 10/2004 | Fitzgerald et al. | |
| 2004/0215560 A1 | 10/2004 | Amalraj et al. | |
| 2004/0230526 A1 | 11/2004 | Praisner | |
| 2004/0230539 A1 | 11/2004 | Praisner | |
| 2004/0236646 A1 | 11/2004 | Wu et al. | |
| 2005/0021454 A1 | 1/2005 | Karpovich et al. | |
| 2005/0021455 A1 | 1/2005 | Webster | |
| 2005/0038739 A1 * | 2/2005 | Doran et al. | 705/40 |
| 2005/0049963 A1 | 3/2005 | Barry | |
| 2005/0075960 A1 | 4/2005 | Leavitt et al. | |
| 2005/0097040 A1 | 5/2005 | Chen et al. | |
| 2005/0102231 A1 | 5/2005 | Remington et al. | |
| 2005/0137952 A1 | 6/2005 | Yamamoto et al. | |
| 2005/0154674 A1 | 7/2005 | Nicholls et al. | |
| 2005/0167481 A1 | 8/2005 | Hansen et al. | |
| 2005/0171811 A1 | 8/2005 | Campbell et al. | |
| 2005/0177437 A1 | 8/2005 | Ferrier | |
| 2005/0177495 A1 | 8/2005 | Crosson Smith | |
| 2005/0177504 A1 | 8/2005 | Crosson Smith | |
| 2005/0177521 A1 | 8/2005 | Crosson Smith | |
| 2005/0197957 A1 | 9/2005 | Keith et al. | |
| 2005/0209965 A1 | 9/2005 | Ganesan | |
| 2006/0015452 A1 | 1/2006 | Kulasooriya et al. | |
| 2006/0015453 A1 | 1/2006 | Kulasooriya et al. | |
| 2006/0036543 A1 | 2/2006 | Blagg et al. | |
| 2006/0059088 A1 | 3/2006 | Krikorian et al. | |
| 2006/0173779 A1 | 8/2006 | Bennett et al. | |
| 2006/0190380 A1 | 8/2006 | Force et al. | |
| 2007/0011104 A1 | 1/2007 | Leger et al. | |
| 2008/0021835 A1 * | 1/2008 | Ginter et al. | 705/51 |
| 2008/0208707 A1 * | 8/2008 | Erbey et al. | 705/26 |

OTHER PUBLICATIONS

"Mastercard Remote Payment and Presentment Services." Downloaded from http://www.mastercardintl.com/rpps/lvl2.cgi/about_1.

* cited by examiner

FIG. 14

Electronic Payment Gateway Homepage

Home | Payment Center ▼ | [This is the default Payment Center "home." This View dropdown will allow them to switch to individual/one-off payments] lerts ▼ | Administration ▼ | Buyer ▼

Payment Center

View: Batch Payments ▼ | Month: December ▼ | Year: 2005 ▼ | Status: All ▼ | Type: All ▼

| Date ▼ | Batch/Supplier | S[Clicking here would display the next level of detail for that payment] | ID? ▼ | Amount ▼ | Total Payments |
|---|---|---|---|---|---|
| 00/00/0000 | Card-09Sep05-CM-2 | Exception | 123456 | 0000.00 | 12 |
| 00/00/0000 | ACH-09Sept06-JB-1 | XPY | 123457 | 0000.00 | 25 |
| 00/00/0000 | Card-09Sep05-CM-2 | Paid ACH | 123456 | 0000.00 | 12 |
| 00/00/0000 | ACH-09Sept06-JB-1 | Exception XPY | 123457 | 0000.00 | 25 |
| 00/00/0000 | Card-09Sep05-CM-2 | Paid ACH | 123456 | 0000.00 | 12 |
| 00/00/0000 | ACH-09Sept06-JB-1 | Exception XPY | 123457 | 0000.00 | 25 |
| 00/00/0000 | Card-09Sep05-CM-2 | Paid ACH | 123456 | 0000.00 | 12 |
| 00/00/0000 | Card-09Sept06-JB-1 | Exception XPY | 123457 | 0000.00 | 25 |

Copyright Statement

Link to EXXX | FAQs | Privacy Policy | Terms & Conditions | Contact Us

3

ELECTRONIC TRANSACTION APPARATUS AND METHOD

CROSS-REFERENCE TO RELATED APPLICATIONS

This patent application claims the benefit of U.S. Provisional Patent Application Ser. No. 60/802,673 filed May 23, 2006 and entitled "Electronic Transaction Apparatus and Method" of inventors John M. Lovelett et al. The disclosure of the aforementioned Provisional Patent Application Ser. No. 60/802,673 is expressly incorporated herein by reference in its entirety.

FIELD OF THE INVENTION

The present invention relates generally to electronic commerce, and, more particularly, to electronic payment systems and methods.

BACKGROUND OF THE INVENTION

New techniques are constantly sought to enhance convenience and efficiency of electronic payments. MasterCard International Incorporated of Purchase, N.Y. currently has a business-to-business (B2B) electronic payment program in the marketplace, available under the trademark MasterCard e-P3®. The MasterCard e-P3® electronic payment system successfully integrates a MasterCard Purchasing Card (MasterCard e-P3 Payables Account™) and MasterCard Remote Payment and Presentment Services (RPPS® brand provision of secure electronic delivery of billing remittance data and funds) as settlement options within EIPP (electronic invoice presentment and payment) networks.

US Patent Publication 2004/0215560 of Amalraj et al. discloses an automated computer based payment system and method allowing a variety of different payment requesting sources to be coupled to a variety of payment processors. An integrated payment engine receives payment requests from the payment requesting sources and generates therefrom payment instructions that are delivered to the payment processors. The integrated payment engine employs profile information defining payment requesting source and payment processor preferences and requirements to generate the payment instructions from the payment requests. Additional and/or different payment requesting sources and payment processors can be integrated into the system easily by modifying the profile information. The integrated payment engine also employs flexible risk and operational preferences to generate automatically a payment instruction which will implement the payment request so as to optimize a balance of factors associated with making a payment, such as risk and cost.

U.S. Pat. No. 5,465,206 to Hilt et al. discloses a bill pay system wherein participating consumers pay bills to participating billers through a payment network operating according to preset rules. The participating consumers receive bills from participating billers (paper/mail bills, e-mail notices, implied bills for automatic debts) which indicate an amount, and a unique biller identification number. To authorize a remittance, a consumer transmits to its bank (a participating bank) a bill pay order indicating a payment date, a payment amount, the consumer's account number with the biller, a source of funds and the biller's biller identification number, either directly or by reference to static data containing those data elements. Bank C then submits a payment message to a payment network, and the payment network, which assigns the biller reference numbers, forwards the payment message to the biller's bank. For settlement, the consumer's bank debits the consumer's account and is obligated to a net position with the payment network; likewise, the biller's bank receives a net position from the payment network and credits the biller's bank account. If the consumer's bank agrees to send non-reversible payment messages, the consumer's bank does not submit the transaction until funds are good unless the consumer's bank is willing to take the risk of loss if funds are not good, in the case of a guaranteed payment network. The biller's bank, upon receipt of the payment message, releases the funds to the biller, and provides A/R data to biller in a form which biller B has indicated, the form being one which does not have to be treated as an exception item to the biller. The biller's bank is assured of payment by the payment network, unless the transaction is a reversible transaction according to the preset rules of the payment network. In specific embodiments, the consumer initiates the bill pay orders manually, via paper at an automated teller machine (ATM), via personal computer (PC), or via telephone keypad.

While certain systems, such as the MasterCard e-P3® electronic payment system, have resulted in a substantial improvement in the art, further progress is desirable.

SUMMARY OF THE INVENTION

Principles of the present invention provide techniques for electronic transactions. In one aspect, an exemplary method includes the steps of facilitating obtaining a payment file associated with a buyer (for example, directly from the buyer, or from a third party partner), the file comprising data specifying a first form of payment from the buyer to a first biller and data specifying a second form of payment, different than the first form of payment, from the buyer to a second biller; facilitating appending first stored data to the data specifying the first form of payment to the first biller, to effectuate payment to the first biller by the first form of payment; and facilitating appending second stored data to the data specifying the second form of payment to the second biller, to effectuate payment to the second biller by the second form of payment.

An exemplary embodiment of an apparatus, according to another aspect of the invention, can include a memory and at least one processor coupled to the memory. The processor can be operative to facilitate performance of one or more of the method steps described herein. In another aspect, the apparatus can comprise means for performing the various method steps. The means can include one or more hardware modules, one or more software modules, or a mixture of one or more software modules and one or more hardware modules. One or more method steps of the present invention can be implemented in the form of an article of manufacture comprising a machine readable medium that contains one or more programs that when executed implement such step or steps.

In another aspect, an exemplary method for electronic payment includes the steps of facilitating obtaining payment instructions associated with a buyer, the instructions comprising data specifying payment from the buyer to at least one of a plurality of billers, the data including an identification of the at least one biller; and facilitating appending first stored data to the data specifying the payment to the at least one biller, to effectuate payment to the at least one biller. The obtaining and appending steps are performed by a payment service operator and the identification of the at least one biller is assigned by a party other than the payment service operator.

One or more techniques of the present invention can provide one or more of the following substantial beneficial effects, for example: use of existing data residing in corporate systems to make decisions and route, and/or efficiencies from outsourcing data maintenance associated with managing vendor data (shared supplier network).

These and other features and advantages of the invention will become apparent from the following detailed description of illustrative embodiments thereof, which is to be read in connection with the accompanying drawings.

BRIEF DESCRIPTION OF THE DRAWINGS

FIGS. 13-15 are exemplary screens of an inventive portal application;

DETAILED DESCRIPTION OF PREFERRED EMBODIMENTS

Note that unless otherwise noted herein, all trademarks denoted with the "®" symbol, if any, are registered trademarks of MasterCard International Incorporated of Purchase, N.Y. USA, and all trademarks denoted with the "™" symbol, if any, are trademarks of MasterCard International Incorporated of Purchase, N.Y., USA.

Figure 1:
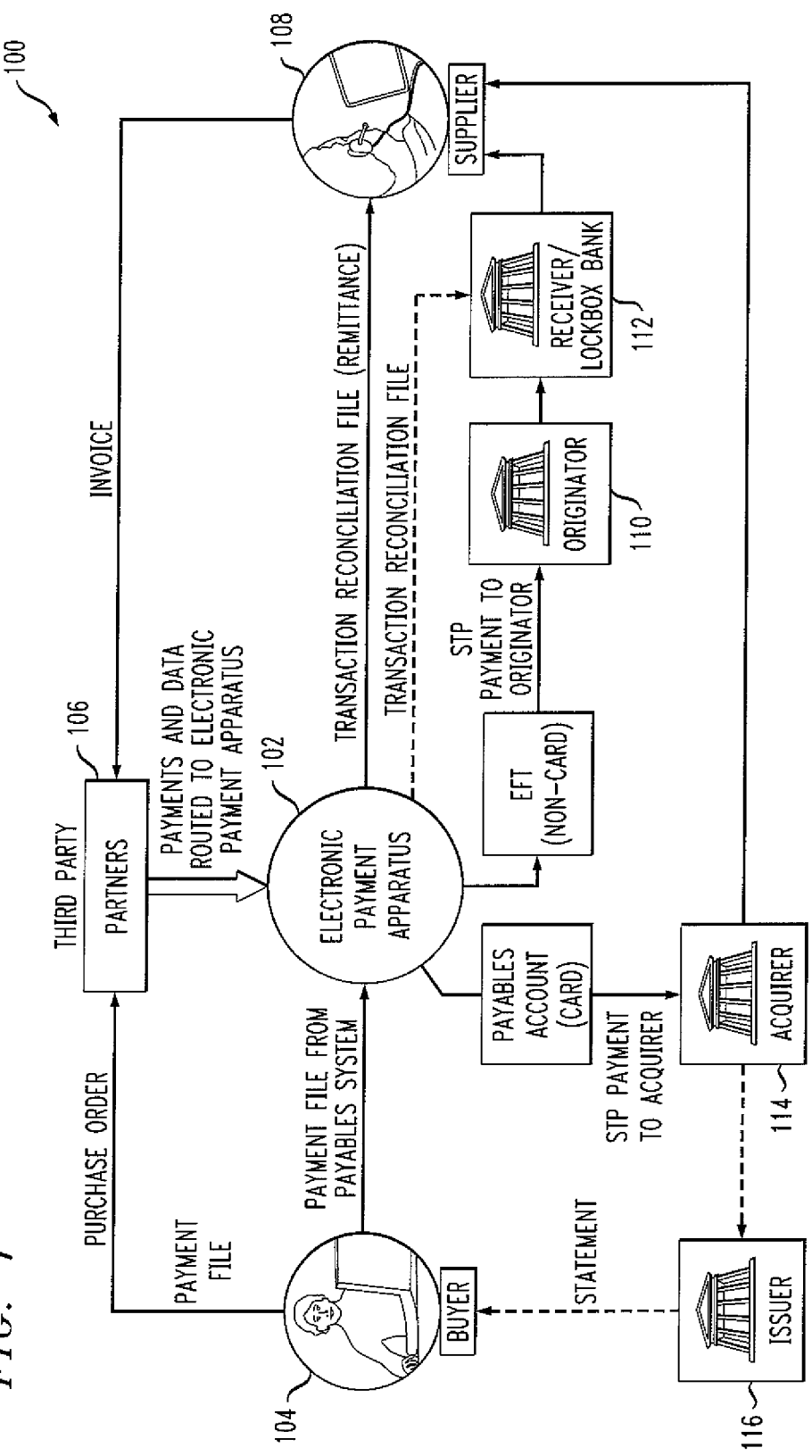
FIG. 1 presents a diagram showing high-level operation of an exemplary electronic payment apparatus, according to an aspect of the invention.

Attention should now be given to FIG. 1, which presents a diagram 100 showing high-level operation of an exemplary electronic payment apparatus 102, according to an aspect of the invention. Apparatus 102 receives a payment file from a buyer 104, either directly or via a third party partner 106. By way of example and not limitation, a "third party partner" can be a business partner of an entity operating apparatus 102 (such entity could be, for example, an operator of a credit-card type payment network). The payment file specifies payment to multiple suppliers 108 (only a single supplier is shown, for purposes of illustrative convenience). Suppliers are referred to herein interchangeably as billers. Further, the payment file specifies multiple forms of payment, for example, one supplier may be paid by electronic funds transfer (EFT) while another may be paid by a payment card. Third party partner 106 may have received a purchase older from one of the buyers 104 and a corresponding invoice from a given one of the suppliers 108. The payment file may include data such as who to pay, how much to pay, what currency to pay in, originating and recipient bank data, reason for the payment (remittance data), and the like. It should be noted that the arrows in FIG. 1 only have arrows at one end; however, information may flow in both directions, for example, between buyer and banks (trx confirmations).

Apparatus 102 appends suitable information (which may be obtained, for example, by pre-registration, as discussed below) to the data in the payment file to effectuate payment. For example, for EFT payment, appropriate communication is made with originator 110, with payment to receiver/lockbox bank 112 (as will be discussed further below, a receiver/lockbox bank is only one specific example of an entity to which payment can be directed). For a payment card form of payment, appropriate communication is made with acquirer 114, which effectuates authorization and payment via issuer 116, in a manner similar to an ordinary credit card transaction. Issuer 116 can provide a statement to buyer 104.

Appropriate remittance information can be provided to supplier(s) 108, for example, using a transaction reconciliation file. This can be sent directly to supplier 108, or via a third party such as receiver/lockbox bank 112.

Apparatus 102 can include a translation module to translate incoming payment files, in cases where multiple incoming file formats are allowed. It can also include translation modules that format payment file data into the required format for EFT or payment card payments. For payment card payments, data can be formatted for the particular processor/acquirer 114, which can send payment data and remittance data in an ISO8583 format, over a network such as BankNet or VisaNet, to issuer 116. Issuer 116 can send remittance data to the ERP of the supplier 108.

In the case of EFT payments, data can be formatted for the particular originating depository financial institution (ODFI) 110, which can send payment data and remittance data in an appropriate format, over a network such as ACH, Swift, EPN, CHIPS, Fedwire, and the like, to receiving depository financial institution (RDFI) 112. RDFI 112 can send remittance data to the ERP of the supplier 108. In some embodiments, the NACHA ACH CCD file format can be used.

In one or more embodiments, a common format can be used for payment files from all buyers 104 and/or a common format can be used for all card and/or all EFT transactions, to minimize the need for translation.

Figure 2:
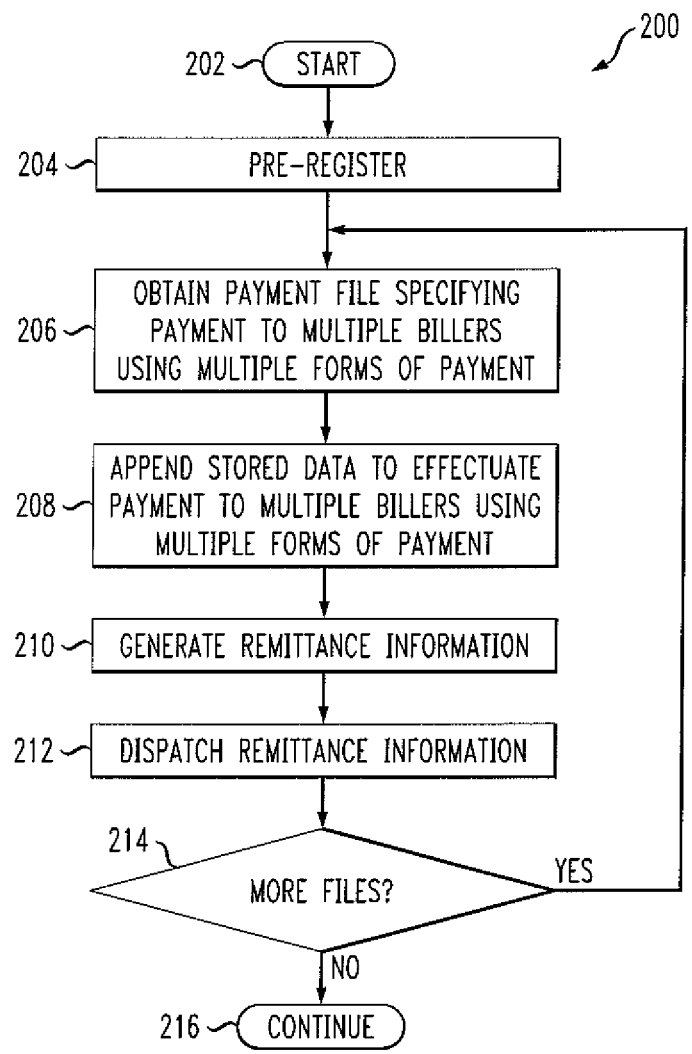
FIG. 2 shows a flow chart of exemplary method steps in a method for electronic payment, according to another aspect of the invention.

FIG. 2 shows a flow chart 200 of exemplary method steps in a method for electronic payment, according to an aspect of the invention. After starting at block 202, block 204 includes an optional pre-registration step, discussed further below. Step 206 includes facilitating obtaining a payment file associated with a buyer ("associated with a buyer" is intended to cover the case where the file is received directly from the buyer or from a third party on behalf of the buyer, as discussed above with regard to FIG. 1). As used herein, "facilitating" an action includes performing the action, making the action easier, helping to carry the action out, or causing the action to be performed. The file includes data specifying payment to multiple billers using multiple forms of payment, for example, data specifying a first form of payment from the buyer to a first biller and data specifying a second form of payment, different than the first form of payment, from the buyer to a second biller. Step 208 includes facilitating appending stored data to the data specifying payment to multiple billers, to effectuate payment to the multiple billers using the multiple forms of payment. For example, step 208 can include facilitating appending first stored data to the data specifying the first form of payment to the first biller, to effectuate payment to the first biller by the first form of payment, and facilitating appending second stored data to the data specifying the second form of payment to the second biller, to effectuate payment to the second biller by the second form of payment.

Optionally, step 210 can be performed. In step 210, generating remittance information associated with the payment to the first biller and the payment to the second biller is facilitated. In one or more embodiments, supplier(s) 108 can choose whether they want a remittance; in a preferred approach, a default condition is such that the suppliers 108 get a remittance, but they can opt out, for example, by un-checking a box during enrollment. In some instances, the remittance information includes first remittance information associated with the payment to the first biller and second remittance information associated with the payment to the second biller. As shown at block 212, an additional optional step includes facilitating dispatching remittance information, for example, facilitating dispatching the first remittance information associated with the payment to a destination associated with the first biller, and facilitating dispatching the second remittance information associated with the payment to a destination associated with the second biller.

The destination associated with the first biller can be, for example, a third party representative of the first biller, and the destination associated with the second biller can be, for example, the second biller. It should be noted that the lockbox 112 is one option envisioned for EFT payments; lockbox operation is one specific exemplary instance of a third party representative of the first biller. In general terms, a lockbox is a product type, and the third party need not be limited to a bank per se, but could be, for example, a lockbox service company. One example of dispatching the first remittance could be e-mailing a remittance file; another example is posting a remittance file. Such activities ate preferably done in a secure manner.

Harking back to step 206, as discussed elsewhere, in some instances, the payment file is obtained directly from the buyer. In one or more embodiments, at least a portion of the payment file originates in a payables system of the buyer. One non-limiting example of a payables system is an enterprise resource planning (ERP) system. However, less complex payables systems can also be configured to provide appropriate payment files or portions thereof. References herein to an ERP are to be understood as exemplary of other types of payables systems as well. In some cases, the payment to the first biller is associated with a first account payable between the first biller and the buyer (and optionally, a first purchase order and/or a first invoice) and/or the payment to the second biller is associated with a second account payable between the second biller and the buyer (and optionally, a second purchase order and/or a second invoice). In such cases, the portion of the payment file is formed, at least in part, from data in the payables system associated with the first account payable and the second account payable. Still with reference to step 206, in other exemplary embodiments, the payment file is obtained from a third party provider (such as partner 106) who has received purchase order data from the buyer 104, first invoice data from the first biller, and second invoice data from the second biller. In general, payment files received from third parties may or may not be based on purchase orders and/or invoices. Of course, provision can be made for the same apparatus 102 to receive payment files from a number of different buyers and/or third party partners.

As noted, the payment file specifies multiple forms of payment. By way of example and not limitation, the second form of payment could be a card-based technique and the first form of payment could be an EFT technique. The card-based technique can be carried out via an acquirer 114. For example, apparatus 102 can cause acquirer 114 to send an authorization message (real-time or batch) to issue 116, in a manner similar to ordinary credit card processing. If approval is obtained from issuer 116, apparatus 102 can cause acquirer 114 to settle with supplier 108. Where the biller 108 supports such techniques, the aforementioned second stored data can include a card account number and expiration date of a payment card account of the buyer and an acquiring merchant identification (ID) of the second biller. In some cases, buyers may not support such activities, in which case the second stored data can include, for example, a card account number and expiration date of a payment card account of the buyer, and effectuating payment to the second biller can include making the card account number and the expiration date of the payment card account of the buyer available to the second biller (for example, by secure web interface or secure e-mail), so that the second biller can initiate a second-biller-initiated transaction. Thus, the payment to the second biller can include an authorization step and a settlement step. The EFT technique can be carried out via an originator 110. Further details regarding exemplary EFT techniques are set forth elsewhere herein.

Figure 4:
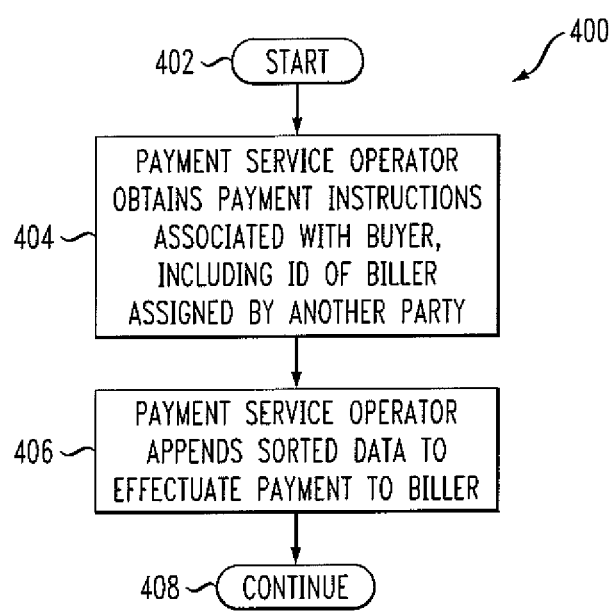
FIG. 4 shows an exemplary method for electronic payment employing an inventive biller identification.

In one or more embodiments, the data specifying the first (and/or second) form of payment includes an identification of the buyer, an identification of the first biller, an amount of the first payment, and reference data associated with an underlying transaction for the first payment (e.g., invoice number, purchase order number, and so on). Further, in some instances, the obtaining and appending steps 206, 208 are performed by a payment service operator, such as the entity operating apparatus 102 (for example, a credit card payment network operator). Identification of the first (and/or second) biller is preferably assigned by a party other than the payment service operator (for example, generated by buyer or supplier systems). This approach beneficially allows use of existing data residing in corporate systems to make decisions and route. It should be noted that each location of the same company can be thought of as a separate biller. In some approaches, the identification of the first (and/or second) biller is assigned by the buyer. Non-limiting examples include a "Site ID" by itself (a unique number assigned by the buyer) or a "Vendor ID" originating from buyer's payable system—further possibilities are discussed below with regard to FIG. 4. In some instances, the data specifying the first form of payment further includes an identification of a debit account of the buyer. See further discussion below in the section entitled "Outbound from Electronic Payment Apparatus—EFT Processing." Further, the first stored data can include, for example, routing and account number information for a bank associated with the first biller.

It is currently believed preferable that the data specifying the first form of payment is an explicit indication that the EFT technique is to be used (for example, there can be a field in the payment file that can have a value of "ACH" for EFT or "CPC" for corporate purchasing card). However, in some instances, the indication is implicit; for example, an additional step of determining that the EFT technique is to be used could be performed—such determination could be based on implicit information, such as the identification of the first biller. Further, it is currently believed preferable that the data specifying the second form of payment is an explicit indication that the card-based technique is to be used (for example, the aforementioned "CPC"). However, as with EFT, in some instances, the indication is implicit; for example, an additional step of determining that the card-based technique is to be used could be performed—such determination could be based on implicit information, such as the identification of the second biller.

Still referring to FIG. 2, optionally, decision block 214 can be executed to determine whether more payments files are to be processed; if so, as per the "YES" branch, one or more of steps 206-212 can be repeated as needed. If no more files are to be processed, as per the "NO" branch, processing continues at block 216 until further action is required or desired. Thus, the aforementioned payment file can be a first payment file, the buyer can be a first buyer, and the remittance information can be first buyer remittance information, and one or more of the following additional steps can be performed: facilitating obtaining a second payment file associated with a second buyer, the file comprising data specifying the first form of payment from the second buyer to a third biller and data specifying the second form of payment from the second buyer to a fourth biller; facilitating appending third stored data to the data specifying the first form of payment to the third biller, to effectuate payment to the third biller by the first form of payment; facilitating appending fourth stored data to the data specifying the second form of payment to the fourth biller, to effectuate payment to the fourth biller by the second form of payment; and facilitating generating second buyer remittance information associated with the payment to the third biller and the payment to the fourth biller. The third and fourth billers can be the same or different than the first and second billers. Of course, more than two forms of payment could also be available in some instances.

It is presently believed preferable that in the case when payment files are obtained from multiple buyers, a uniform format is employed by all buyers. However, in some instances, the payment files can be in different formats and can be translated as needed by apparatus 102.

Figure 3:
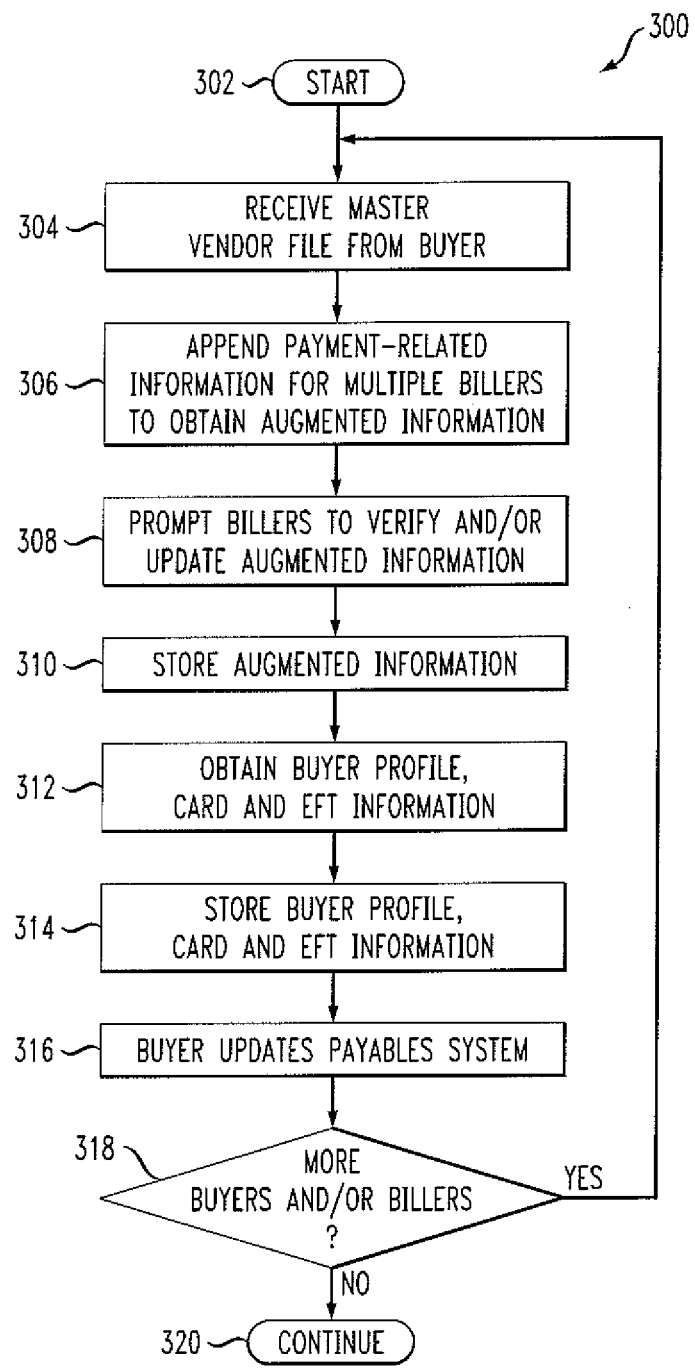
FIG. 3 shows a flow chart of exemplary method steps in a method for pre-registration of the buyer, the first biller, and the second biller, according to yet another aspect of the invention.

As noted, method steps 200 can include pre-registration step 204. With reference now to FIG. 3, one manner in which pre-registration of the buyer, the first biller, and the second biller can be facilitated is depicted therein. For a non-limiting detailed example, refer to "Enrollment/MVF Management" below. Such pre-registration can be conducted to obtain the first stored data and the second stored data. Other entities can pre-register as required or desired, for example, additional buyers and/or additional suppliers. Flow chart 300 begins at start block 302. Step 304 includes facilitating receiving a master vendor file from the buyer, the master vendor file including name and address information for the first biller and the second biller. Step 306 includes appending payment-related information for multiple billers, to obtain augmented information. For example, block 306 can include appending payment-related information for the first biller to the name and address information for the first biller to obtain augmented first biller information, and appending payment-related information for the second biller to the name and address information for the second biller to obtain augmented second biller information.

Step 308 includes prompting the billers to verify and/or update the augmented information, for example, facilitating prompting the first biller and the second biller to perform at least one of verifying and updating the augmented first biller information and the augmented second biller information, respectively. Block 310 includes facilitating storing the augmented first biller information and the augmented second biller information, for example, in a supplier registry database to be discussed below with reference to FIGS. 5 and 6.

Optionally, method steps 300 further include block 312, facilitating obtaining of buyer profile, payment card and electronic fund transfer information, and block 314, facilitating storing the buyer profile, payment card and electronic fund transfer information, for example, in a buyer registry database to be discussed below with reference to FIGS. 5 and 6. The step of facilitating pre-registration can further include the additional sub-step of facilitating the buyer's updating his own payables system, as shown at block 316, based at least in part on the at least one of verifying and updating the augmented first biller information and the augmented second biller information, as performed in block 308. Stated differently, a mechanism is facilitated for the buyer to update its ERP or other payables system, based on post-supplier-validated data.

As shown at the YES branch decision block 318, if there are more buyers and/or billers, the additional step of repeating one or more of the described steps can be performed for one or more additional buyers and/or additional billers. Conversely, if all buyers and billers have been pre-registered, processing can continue at block 320, as per the "NO" branch of block 318, until further action is required or desired.

In one or more embodiments, the flow of FIG. 3 can include an "acceptance match" process having four major areas, as follows:
Upload
Acceptance Matching
Output
Analysis The acceptance match analysis is performed on a prospective buyer's Master Vendor File (MVF), received at step 304. This process can be initiated by submitting a condensed version of an MVF, in a specified format, into a match engine, fronted by a user interface. The engine itself can use the criteria in the table below when identifying a match. The following table is a list of the fields included in the file input layout. The three fields currently believed to be non-optional in this approach are listed in BOLD. In addition to these required fields, any one or more of the remaining fields: city, postal code, telephone number or tax id, would likely increase the match percentage, if present. Exemplary file formats include csv (comma separated value) and xls (Microsoft Excel® worksheet—registered mark of Microsoft Corporation, Redmond, Wash., USA).

TABLE 1

Exemplary Matching Technique CSV File Format

| Position | Field Name | Format | Notes |
|---|---|---|---|
| 1 | Location Id | Numeric | This is an optional field, but if provided, should be unique. It will be used as a key field that will be presented back in the output file, allowing for merging back to the original file at the end of the process. If not present on the MVF, the system will generate a unique sequential number for each record. |

TABLE 1-continued

Exemplary Matching Technique CSV File Format

| Position | Field Name | Format | Notes |
|---|---|---|---|
| 2 | DBA Name | Alphanumeric | Required field. |
| 3 | Street Address | Alphanumeric | Required field. |
| 4 | City Name | Alphanumeric | Optional field. |
| 5 | Province/State Code | Alphanumeric | Required field. |
| 6 | Postal Code | Alphanumeric | Optional field. |
| 7 | Telephone Number | Numeric | Optional field. |
| 8 | Tax ID | Numeric | Optional field. |
| 9 | D&B Number | Numeric | Optional field. |
| 10 | Country Code | Alphanumeric | Optional field. (default 'USA') |

Once a MVF has been received in this format, the data can be passed through a "cleansing mechanism" that will provide valid street addresses for those locations that did not previously contain address information in the required format. The match is then performed based on the required fields (in bold above, in addition to any of the other fields provided), against a merchant acceptance data repository contained in a data warehouse accessible to the apparatus 102. Using the output of the acceptance match results, an analysis of the current known acceptors (e.g., suppliers who accept financial payment services provided by the operator of apparatus 102—say, those who accept MASTERCARD® cards) is provided back to the buyer with supplier enablement recommendations. This process can facilitate, by way of example and not limitation, step 308 in FIG. 3.

As discussed elsewhere herein, there are advantages to using a biller identification that is not assigned by the operator of apparatus 102. The various exemplary forms of biller identification discussed herein can be used with other electronic payment systems. Thus, in general terms, and with reference now to FIG. 4, an exemplary method for electronic payment (shown as flow chart 400) can include steps depicted therein. After beginning at block 402, step 404 includes facilitating obtaining payment instructions associated with a buyer (this can be directly from the buyer or from a third party acting on behalf of the buyer), the instructions comprising data specifying payment from the buyer to at least one of a plurality of billers, the data including an identification of the at least one biller. Step 406 includes facilitating appending first stored data to the data specifying the payment to the at least one biller, to effectuate payment to the at least one biller. Advantageously, steps 404 and 406 are performed by a payment service operator and the identification of the at least one biller is assigned by a party other than the payment service operator. The indicated approach allows use of existing data residing in corporate systems to make decisions and route. In some instances, the identification of the at least one biller is assigned by the buyer. Non-limiting examples include a unique number assigned in whole or in part by the buyer, such as Site ID; Vendor ID originating from buyer's payable system; a tax identification number of the first biller and a site identification of the first biller, the site identification being assigned by the buyer; or a tax identification number of the buyer and a site identification of the first biller, the site identification being assigned by the buyer. In some instances, a number assigned by a third party, such as the Dun & Bradstreet "Dun's #" (Dun's number), can be used. Processing continues at block 408 until further action is required or desired.

The skilled artisan, given the teachings herein, will appreciate that one or more inventive techniques can be employed in cross-border situations requiring foreign exchange (currency conversion). Currency-related information can be stored, for example, in a supplier registry described elsewhere herein. One or more embodiments of the invention function similarly in such cross-border situations, so long as the originator 110 in FIG. 1 is located in a predetermined jurisdiction, such as the United States of America.

It should be noted that in one or more inventive embodiments, there need be no specific relationship between the different buyers and suppliers, or the different transactions for which payment is to be made. However, advantageously, payment obligations associated with the transactions may come due around the same time and/or a given buyer may want to pay them around the same time (for example, monthly).

In some instances, inventive techniques are implemented via the aforementioned electronic payment apparatus 102, which is referred to in the aforementioned U.S. Provisional Patent Application Ser. No. 60/802,673 as an electronic payment gateway. Please note that MasterCard International Incorporated has filed Section 1(b) service mark application serial number 77010446 for MASTERCARD PAYMENT GATEWAY used in connection with facilitating the transaction of business-to-business payments, and other services. One or more inventive embodiments can facilitate expansion of payment services, both card and non-card, into new categories of spending; e.g., the type of spending that is associated with an accounts payable (A/P) purchase order and invoice process ("A/R" refers to "accounts receivable").

One or more embodiments of the invention can have one or more of the following features:
1. A payment-card payment processing network-hosted, centralized gateway for routing and settling commercial electronic-payments between payers and suppliers (payees) and their financial institutions, with one or more of the following core functions;
   inbound transaction file integration from payers and third-party systems
   data translation and management
   outbound file processing to banks and/or processors
   buyer registry
   supplier registry
   acquirer registry
2. A multi-payment settlement service including, by way of example and not limitation:
   payables account payments (credit and/or ghost card account settlement)
   electronic funds transfer (EFT) payments (corporate demand deposit account (DDA) settlement)
   conventional check payments
3. A web-based portal for payers and suppliers (payees) that provides, e.g., one or more of the following key functions/services;

acceptance/enrollment payment and remittance content payment status and exception management supplier data maintenance reporting and reconciliation One or more embodiments of the electronic payment apparatus can support 'payer initiated' straight through payment processing, Payments can be initiated by the 'payer' corporation through their ERP or accounts payable (A/P) system, and can be submitted directly to the acquirer processor or originator for clearing and settlement.

Pertinent characteristics of inventive techniques can include, by way of example and not limitation, one or more of:

1. A method for acquiring and validating company and bank routing information, including account and routing information for EFT and card account settlement;
2. A procedure for processing multiple payment methods and associated remittance data with a single file transmission from payer's A/P system (based, for example, on routing data acquired in point 1 immediately above);
3. A process for shielding payer and payee account information.

Inventive techniques can provide, e.g., "end to end" functions and modules for the electronic payment apparatus. Functional aspects can include:
1. Inbound from Payer ERP
    functional requirements and processes related to the Payer corporations submitting payment files to the electronic payment apparatus 102
2. Electronic Payment Apparatus Data Translation & Management
    processing and editing functions performed by the Electronic Payment Apparatus upon receipt of the inbound payment instruction file
3. Outbound from Electronic Payment Apparatus—Card Processing
    outbound processing of a credit card (or other payment card) transaction
4. Outbound from Electronic Payment Apparatus—EFT Processing
    outbound processing of an EFT payment transaction to automated clearing house (ACH) and/or RPPS® brand service originating financial institutions.
5. Enrollment/MVF Management
    Master Vendor File ("MVF") matches processes as well as the 'end to end' supplier enrollment procedures and synchronization between electronic payment apparatus and a payer's enterprise system.
6. Electronic Payment Apparatus Portal/Web-Site & Reporting Functionality
    'end to end' requirements for the electronic payment apparatus web portal (including web-site functionality such as alerts, reports, searches, etc.)
7. Electronic Payment Apparatus Implementation and Customer Support
    customer support functions related to the electronic payment apparatus
8. Third Party Network Integration
    requirements for third party networks (e.g., electronic invoice presentation and payment (EIPP) vendors) to integrate into the electronic payment apparatus for payment processing.

One or more embodiments can also include cross-border functionality, taking currency exchange requirements into consideration as appropriate Specific Detailed Example A specific detailed example, considering the functional aspects above, will now be presented. It is to be understood that this represents one specific example for purposes of further illustrating inventive techniques, and is not meant to be limiting 1—Inbound from Payer ERP One or more inventive embodiments can support various end-user file formats. The most commonly used formats originated from ERP (or other payables) systems for commercial payments are:

BAI2
   NACHA: CCD, CCD+ and CTX
   EDI: ANSI X. 12 820, 824, 997
   SWIFT: MT 101, MT 103, MT 103 bulk, MT940, MT942
   ISO: 20022
   EDIFACT: PAYMUL, DIRDEB, FINSTA, BANSTA, CONTRL
   SAP iDOC At present, it is believed appropriate for the payment file received from buyer 104 to be based on the EDI STP 820 format. Further, it is currently believed preferable that all buyers use the same format Pertinent factors include:

1. EDI 820 captures both payment order and remittance in a single file;
2. EDI 820 is common business-to-business (B2B) standard for originating transactions from ERP systems;
3. EDI STP 820 (developed by the Electronic Payments Network/EPN) is an emerging standard in banking for EFT payments;
4. EDI STP 820 provides the most common remittance elements necessary for non-EDI suppliers to reconcile payments received from customers (payers);

Vendors of accounts receivable and treasury software are incorporating the standard into their products.

Figure 5:
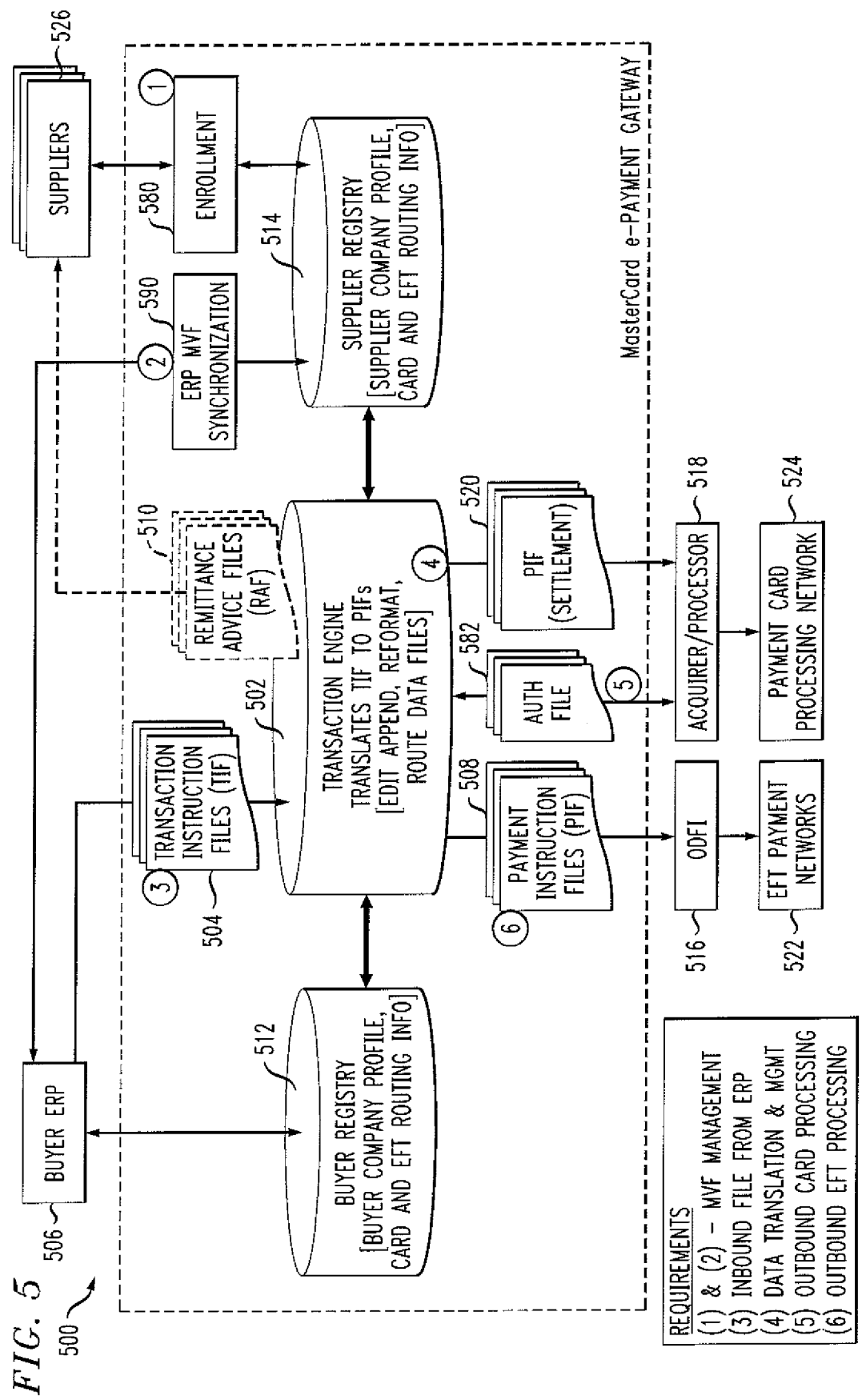
FIG. 5 shows one specific exemplary detailed implementation of several aspects of the invention.

Reference should now be had to FIG. 5, which shows one specific exemplary detailed implementation 500 of several aspects of the invention. In one or more inventive embodiments, file-based payment origination from an ERP or other payables system can be carried out as follows. The transaction engine 502 (together with registries 512, 514 forming one specific exemplary instantiation of apparatus 102) will accept a Transaction Instruction File (TIF) 504 delivered by a Payer's (Buyer's) ERP 506 or other payables system. See the encircled numeral "3." The TIF 504 will include all of the data necessary to create the associated Payment Instruction File (PIF) 508 and Remittance Advice File (RAF) 510. The creation of the TIF 504 is, in one or more exemplary embodiments, the Payer's responsibility. As noted, the TIF is preferably based on a standard EDI STP 820 format. In one or more embodiments, a MasterCard TIF format can be used, but various formats can be supported. The TIF file from the Payer will typically not contain the payer's card account details. Prior to sending the file for settlement, the transaction engine 502 can associate and/or append the Payer's credit card information housed in Buyer Registry 512 to the file. The TIF file 504 can contain the Payer's DDA (debit account) information. The engine 502 will typically only use (apply) the Payer's DDA account in the creation of outbound EFT files.

Typical RAF elements in the EDI 820 file are (the skilled artisan is familiar with EDI 820 and the indicated elements, and given the teachings herein, can adapt same for inventive purposes—in some instances, typical remittance elements can be in an RMR segment):

a. RMR File
   b. ADX file as applicable c. Check number
d. Card account number partially masked (not included in the inbound file)
e. Payer Name
f. Vendor Name
g. Payment date The Payer can assign and provide a Payment Reference ID (reference number) for each payment. This Payment ID should flow though the entire life of the transaction so that the Payer can use it at the end of the cycle for reconciliation. The Payer can provide this number in the TIF file. For example, this code could go in Reference Description field TRN02 in the EDT STP 820 format. The Payer preferably provides a File Specification Document and sample data file(s). The operator of engine 502 may suggest file modifications based upon the data delivered by the customer after an implementation kick-off meeting and before system implementation. In one or more embodiments, all files are originated from ERP 506 (or other payables system) to engine 502. In some embodiments, transactions are not originated directly from engine 502 to banks for either EFT or Card account settlement. Inbound files can be received in engine 502 by, for example, an appropriately configured payment server.

Various connectivity options can be employed. In some instances, Secure file transfer protocol (FTP), under Master-Card Global File Transfer standards, can be employed from the Payer ERP. Use of secure FTP may be advantageous as a common transmission method used between corporations (end-users) and their financial institutions. Files can be pushed from the Payer ERP to engine 502. The skilled artisan is familiar with the aforementioned Global File Transfer from, for example, U.S. Patent Publication number 20020049671, dated Apr. 25, 2002, of Trende et al., entitled "Method and system for processing messages in a bill payment and presentment system over a communications network," the complete disclosure of which is expressly incorporated herein by reference for all purposes.

In one or more embodiments, processing and/or operations can proceed as follows. The payer ERP system can submit batch transactions to the engine 502 once a day at a minimum, but may request transmission multiple times daily. A maximum number of daily processing cycles can be established by the engine 502. The engine can retain the inbound TIFs in their original format for, e.g., 30 days. After that time, the TIF can be deleted. The engine 502 can import the TIF and insert additional payment related details into the file. Post insertion, the records will be ready for delivery to the appropriate bank for settlement. The overall functional flow for engine 502, in one or more embodiments, is:

a. Imports TIF from Payer
b. Clears transaction—engine 502 edits inbound file, identifies payment type per supplier, and appends appropriate routing data acquired from Supplier and Payer Registries 514, 512 respectively
c. Settles transaction—routes payment instruction file (PIF) to ODFI 516 and/or acquirer 518
d. Informs supplier (e.g., via E-mail) that a payment has been submitted and includes remittance data associated with payment (Remittance Advice File/RAF 510). Remittance data can also be made available via a report from engine 502.

Payment management and exception processing can be performed, for example, as follows. The engine 502 will perform file and transaction level edits to the TIF. When a file passes all edits, engine 502 will consider all transactions as being cleared for processing. Transaction routing can then follow. Payment exceptions occur when a TIF fails an edit. If any edits fail at the transaction level, those transactions can be placed in exception. All transactions that pass edits can be cleared for processing. The payer can be notified via a graphical user interface (GUI) and/or an e-mail alert (e.g., send one email per failure batch). If there are errors, one can relay errors per batch, and the reason for failure. Payers can be instructed to 'resume,' 'resubmit,' or 'void' the specific payment(s) in exception before the engine 502 creates the outbound PIF for transmission of that payment to ODFI 516 or acquirer 518. In addition to 'resume,' end-users will have the ability to 'void' a transaction. End-users must be granted permission to either resume or void payment exceptions by the system administrator. If the end-user has permission, they will see a 'Resume' or 'Void' button on their GUI. In some embodiments, edits can be limited in order to minimize administration effort by end-user and engine 502 for processing transactions and managing exceptions. End-users (payers) can void any payment in exception, but can only resume payments in 'Held' status. In the GUI, users will be able to click on the payments in exception to view an audit trail (refer to discussion of portal in FIG. 6 below). In the specific example, payers are only allowed to fix files requiring approval for duplicate file or user configuration edits; they cannot change data.

Payers can be required to submit new transactions from ERP 506 for transactions sent and data edits. These transactions may or may not include the same payment reference ID. For 'resubmit' errors, the user can be required to resend a TIF originated from their ERP. Payment exceptions can occur for the following reasons (edits):

A. Mandatory fields with no data/value
B. Duplicate file edit
C. Inactive Account (supplier or card)
D. Fails based on user configuration. For example, all payments having a value above a specified limit will be held for approval (placed in exception).

For all transactions that go into exception, the payer will be notified both via the GUI and with an email. The payers will be instructed to fix the exception. Fixing an exception allows the transaction to be cleared.

Payment information tracking and reporting can proceed, for example, as follows. The engine 502 will track all TIF files it receives. For audit/investigation purposes, the original inbound files will be staged for 30 days and then deleted. Status reporting/notifications are included as desired and/or required.

In one or more embodiments, the original TIF is not available for viewing online by a payer/administrator; and the transaction data is available to view via a GUI after it has been cleared by the engine 502, i.e., the transaction has been identified/classified by payment type.

Still referring to FIG. 5, note also enrollment block 580 and authorization file flow 582.

2—Electronic Payment Apparatus Data Translation & Management

One or more inventive embodiments provide end-users with a secure and efficient method for originating payment orders and remittances to their suppliers (trading partners). Techniques of one or more aspects of the invention enable performance of the following functions:

1. Collect and validate company and bank profile information via enrollment application;
2. Acquire payment order and remittance advice (transaction instruction file) detail from payers through integration with ERP systems;
3. Translate inbound transaction instruction files (TIF) into outbound payment instruction files (PIFs) for settlement with banks and remittance advice files (RAF) for viewing by suppliers (end-users); and 4. Route PIFs to appropriate ODFIs (EFT account) and acquirers/processors (card account) using secure transport for settlement through electronic payment networks.

Function 3 will now be considered. Continued reference should be had to FIG. 5 for transaction processing and the associated requirements. Data translation and management within the transaction engine 502 is indicated by the encircled numeral "4." Appropriate process and business rules are instituted for clearing TIFs originated from buyer's ERP 506 to the engine 502 in order to build and deliver outbound settlement 520 and remittance advice files 510. The data translation and management requirements assume that the inbound transaction files received from the payer ERP 506 or a third party processor (TPP) have passed edits are ready for clearing. Appropriate actions include:

1. Identifying and appending data stored in buyer and supplier registries 512, 514 to those transactions, e.g., card account number, MID (=merchant ID), etc.,
2. Translating/reformatting files for delivery to banks (e.g., ACH-CCD for use of EFT payment networks 522 and auth/settlement standard at Level 2 for use of payment card processing network 524), and
3. Storing remittance information, received from inbound file, in appropriate databases or other storage associated with engine 502 for use by supplier/merchant 526.

Figure 6:
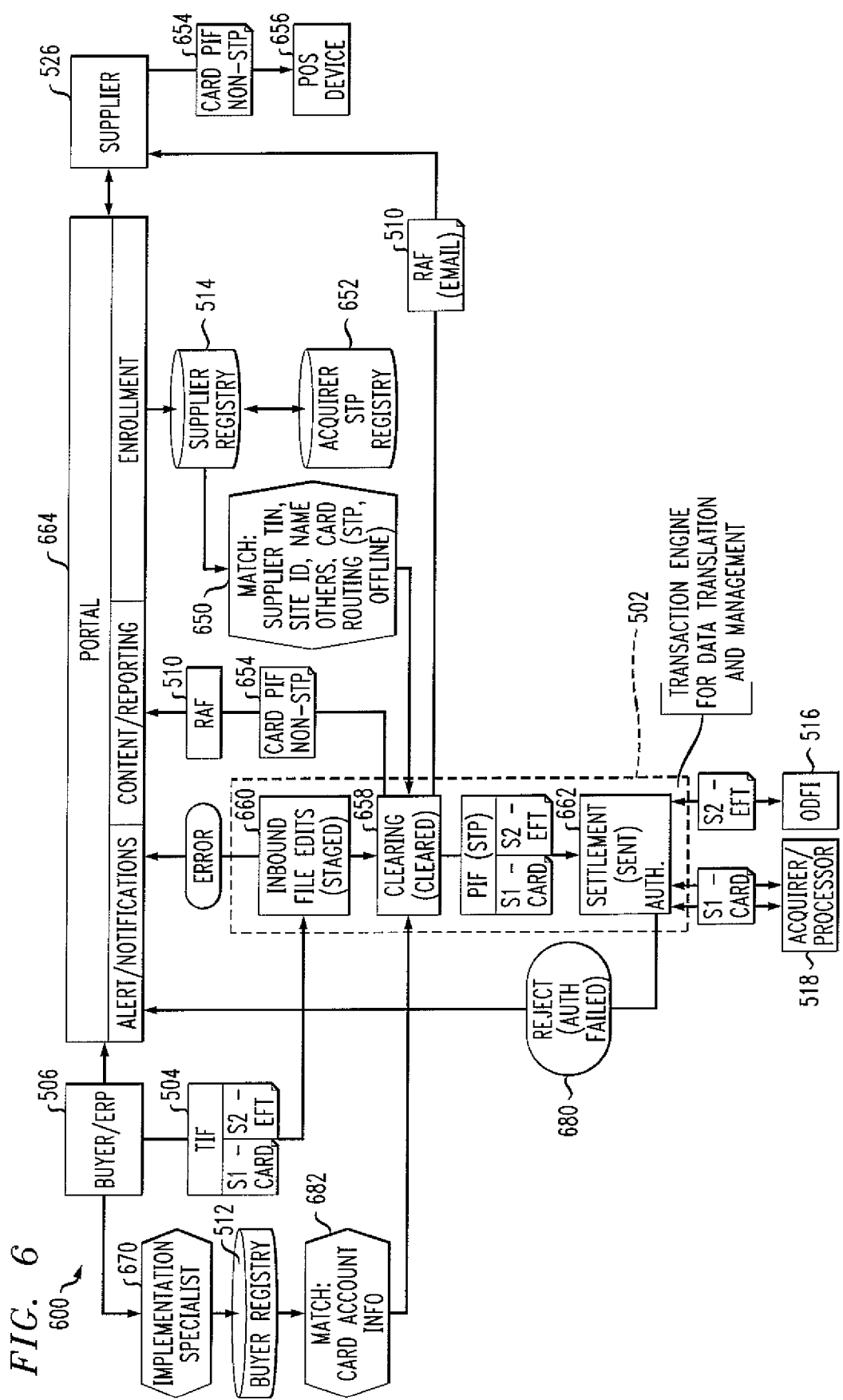
FIG. 6 shows detailed exemplary flows for an exemplary inventive transaction engine.

FIG. 6 shows detailed exemplary flows 600 for transaction engine 502 and impact on other related systems. Further details will now be provided regarding the requirements associated with the clearing process 658. Elements in FIG. 6 similar to those in FIG. 5 have received the same reference characters. We assume that the TIF has passed inbound edits 660. Exemplary business rules for identifying a transaction by payment type for routing purposes are:

a. Match identification of supplier (by way of example and not limitation, Supplier Tax ID, Buyer Tax ID, and/or Site ID fields) in inbound TIF 504 to same data field(s) in supplier registry 514, as per block 650. Both the Supplier Tax ID and Site ID are collected from the buyer in the master vendor file. Supplier Tax ID is validated or added by supplier 526 during the enrollment process.

b. Reference Payment Type from Supplier Registry 514: During the synchronization process (following enrollment), the buyer 506 must (in this example) select payment type for each Site ID. During enrollment the engine 502 will determine if the acquirer/processor supports straight-through processing (STP) (discussed further herein) for the supplier (merchant) relationship. Information for acquirer/processors with STP connectivity will be stored in the acquirer STP registry 652. If a match is made, then the supplier will be classified as "Card, STP" for routing purposes. If a match is not made, then the supplier will be classified as "Card, not STP" for routing purposes. The clearing system will use this information to route directly to acquirer/processor 518 or generate a payment instruction file for presentment to supplier 526 via graphical user interface (GUI)—portal 664 (Card PIF Non-STP block 654 can be provided for a supplier-initiated transaction at point-of-sale (POS) device 656).

c. During the synchronization process, the buyer 506 links each supplier 526 to a payment type. In doing this, the engine 502 links the associated Site-ID in the supplier registry 514 to that payment type. For example, a buyer can pay the same supplier (same Tax ID and Vendor ID) with both an EFT/ACH and a payment card (P-Card). Each payment type would be associated with a different Site-ID. In other embodiments, the type of payment is based on a direct instruction in the TIF.

Exemplary business rules for appending data are:
a If (a) and (b) above match data received on TIF 504, then clearing system 658 appends appropriate data for routing:
1. For EFT: Add bank routing information from Supplier Registry 514—bank transit/routing number, bank account number.
2. For Card:
    i. Validate STP or not-STP (point b above) to determine PIF build requirement.
        1. If STP, then: Add Merchant ID from supplier registry 514 and card account number, expiration date from buyer registry 512 (card configuration module in portal)
        2. If not-STP, then create non-STP PIF 654. Non-STP PIF can include the following data for presentment to Supplier 526 via GUI/Portal 664:
            a. Vendor Name
            b. Payment Date
            c. Card account number (ghost card account)
            d. Expiration date
            e. Payment ID (to be typed into Customer Code field on POS device)
            f. Invoice number
            g. Invoice date
            h. Purchase order (PO) Number
    ii Following enrollment, the engine 502 will reference the acquirer registry 654 to determine routing logic. Transactions can be routed to:
        1. Same processor for both authorization and settlement; or
        2. Different processors for authorization and settlement; or
        3. Supplier directly for offline entry into POS device in case of Non-STP transaction processing, as at 654 and 656.

Bank routing information for buyer (Buyer's DDA account at originating depository financial institution (ODFI) 516) and, in one or more embodiments, Buyer Tax ID, will come in on inbound TIF 504. If it is not in the TIF, inbound edits will fail. The requirements for EFT processing assume that a Buyer would include a single ODFI DDA debit account in the inbound file. The Buyer could select a different DDA account for debiting funds, but would need to (1) send separate inbound files, i.e., separate payment batches or (2) to submit a request for debiting different accounts in the same file (batch); the Buyer would need to send multiple BPR records within the same file. For example:
1. Buyer A→Batch number 1 (GS02)→BPR 1→Buyer DDA Account 1→ODFI 1
2. Buyer A→Batch number 1 (GS02)→BPR 2→Buyer DDA Account 2→ODFI 2

Further functionality can include building outbound payment instruction files for delivery to settlement banks, ODFI 516 in case of EFT and acquirer/processors 518 for "Auth" message For EFT transactions, ODFI routing and (Buyer DDA) account information obtained on the inbound transaction instruction file can be added.

For card, non-STP payments, the electronic payment apparatus clearing system will build the outbound file for delivery to the GUI/portal 664 for presentation to the supplier. The supplier would then use the data in the portal to originate the transaction via his/her POS device 656.

For Non-STP PIF 654, the engine 502 would perform the following functions:

1. Send e-mail notification directing Supplier 526 to access Portal/GUI 664 to obtain information necessary to process the transaction using POS device 656 (offline),
2. Provide Supplier 526 with information necessary to execute card transactions via POS device 656, e.g., card account number, expiration date, payment reference ID (Check number) to be entered into customer code field when prompted by POS device,
3. Provide field for supplier 526 to enter (authorization) 'Approval code' from POS device 656.

During clearing 658, the engine 502 will be required to translate TIFs into one or two different formats, either an ACH-CCD for an EFT payment or a standard ISO 8583 for submitting an authorization message to an acquirer/processor 518. Once "Auth" is approved, the electronic payment apparatus will create a settlement file for use in settlement block 662 (delivery to acquirer/processor 518). Given the teachings herein, the skilled artisan will be able to readily construct a mapping of the inbound TIF 504 to outbound ACH-CCD and Auth/Settlement files, consistent with the inbound and outbound EFT and Card requirements.

The Clearing system 658 has two requirements for building the outbound files:
1. Populate the mandatory fields on the outbound records. For example, in the exemplary embodiment, the ACH-CCD record could have 45 mandatory fields in 5 records (File Header, Batch Header, Entry Detail, Batch Control, and File Control) that must be populated prior to transmission to ODFI.
2. Meet field requirement, e.g: YYMMDD form for date fields.

The inbound TIF 504 can include both a payment order (in some instances, also known as a payment instruction file or PIF—the terminology "PIF" is generally used to refer to files 508 leaving engine 502 but the underlying information for these files can be present in TIF 504) and a remittance. The TIF is preferably based on the ASC X12 (EDI) 820 envelope structure, known to the skilled artisan, which is one preferred structure that can be used. For example, the XML structure can also be supported.

In addition to using the records in the TIF to generate outbound PIFs, the engine 502 will present the payment and invoice (remittance) data to the supplier 526 via the following channels:
1. Email notification—As per block 510, after a transaction is cleared by the engine 502, the Remittance Advice File (RAF) is compiled and sent to supplier 526. To generate the outbound RAF, the electronic payment apparatus will pull the email address stored in the supplier registry 514 in order to create an email distribution. The email is sent after each payment is cleared by the engine 502. The RAF will include the following data elements:
   a. Supplier (Vendor) Name
   b. Payment Date
   c. Total Payment Amount (amount of deposit)
   d. Payment Currency
   e. Payment ID (e.g., check number)
   f. Card account number (partially masked)—as applicable
   g. Card expiration date—as applicable
   h. Invoice Number
   i. Invoice Date
   j. Invoice Amount
   k. Purchase Order (PO) Number—as applicable
   l. Discount taken
   m. Invoice Amount Paid Card information (f and g) should preferably only be included in the email remittance if it is a card payment routed to acquirer 518. This information should not be provided to suppliers 526 in the RAF for EFT settlement. Although unlikely, a scenario could exist whereby a supplier 526 receives an email notification for remittances from the same payer for different payment/settlement types (one for EFT and one for card) on the same day. This scenario would result in separate email notifications to supplier 526.
2. GUI/Portal—Buyer 506 and Supplier 526 will be able to view remittance items associated with each payment online, via portal 664.

Bank routing and account information will not be included in the remittance information provided to the supplier 526. In case of card account payments, the engine 502 will present a masked version of the buyer's card number to the supplier, which displays the last four digits of the account.

Still referring to FIG. 6, note the reject block 680 for a failed authorization, as well as match block 682.

3—Outbound from Electronic Payment Apparatus—Card Processing

Figure 7:
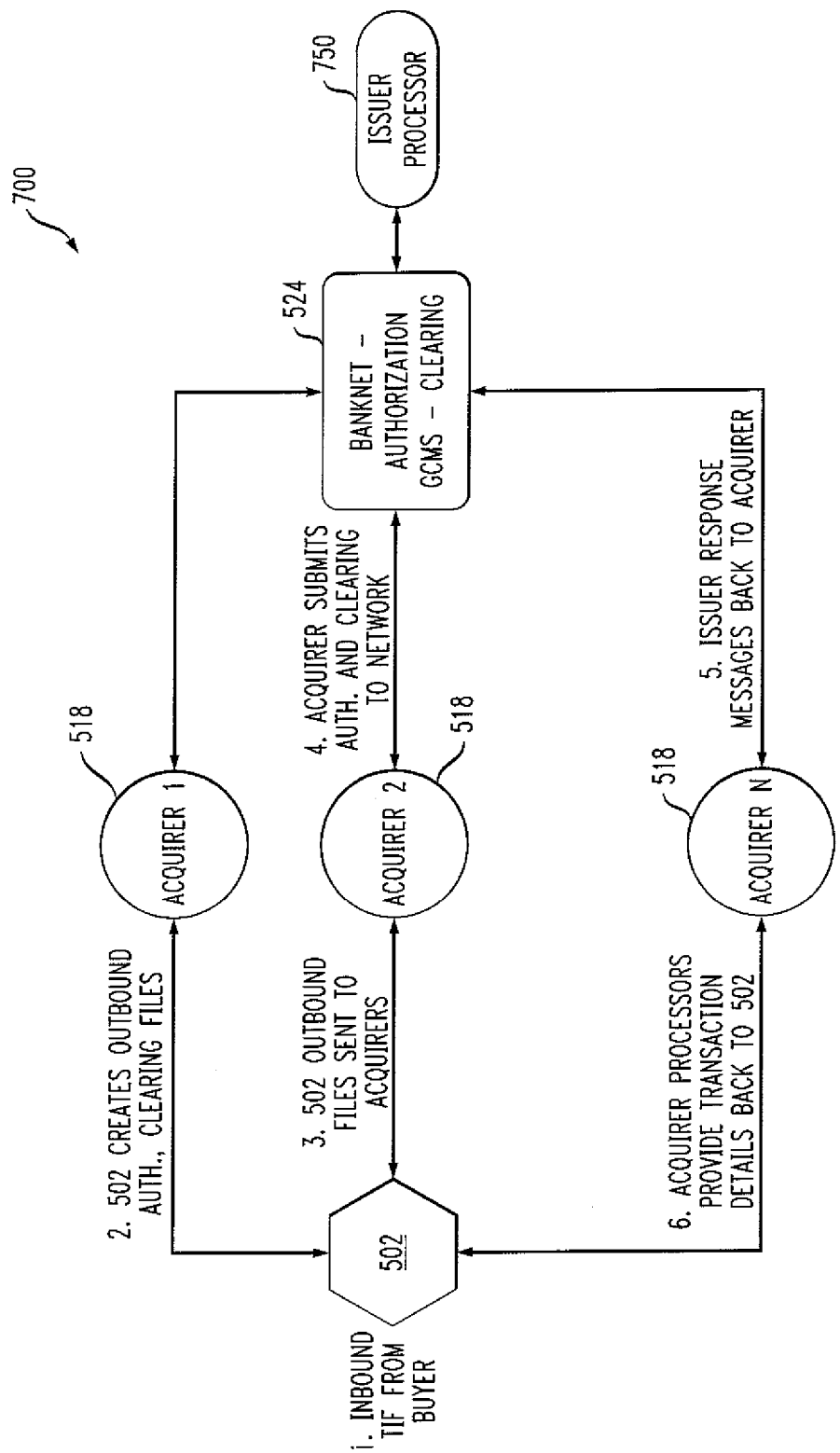
FIG. 7 shows functional requirements for multiple acquirer processor interfaces.

Functional requirements 700 for multiple acquirer processor interfaces to the engine 502, in order to support 'card' authorization and clearing processing, are depicted, at a high level, in FIG. 7. See also encircled numeral "5" in FIG. 5. Engine 502 receives an inbound TIF flow the buyer and creates outbound authorization and clearing files. These awe sent to one of the plurality of acquirers 518, designated from top to bottom as Acquirer 1, Acquirer 2, . . . , Acquirer N. The acquirer submits the authorization and clearing files to network 524 interfacing with issuer processor 750. The response message from issuer 750 is sent back to the appropriate acquirer 518, and transaction details are then provided back to the engine 502.

Engine 502 can support delivery of outbound authorization files to the appropriate acquiring processor in order to support "Card" processing. Each acquiring processor may require support of unique authorization requirements. The engine 502 supports credit card transactions for buyers with a single purchasing card number as well as multiple purchasing card account numbers. Buyers with multiple purchasing account numbers may assign one account number pet supplier. In this scenario, a P-Card account will be associated, for example, to a Supplier SITE ID in engine 502.

The outbound authorization file format can be handled as follows:
1. The engine will dynamically build batch authorization files in the unique format of each acquirer processor interface. The entity operating engine 502 will need to obtain each of the acquirer processor file formats for "Credit Card Purchase" from each of the acquirer processor interfaces.
2. These file formats will be created by engine 502 utilizing the above-discussed Data Translation & Management capability.
3. In some instances, it is not required that an additional data element for buyer reconciliation be submitted in the outbound batch authorization file to the acquirer processor; rather, the data element for buyer reconciliation will be submitted to the acquirer via the clearing message.
4. In some instances, it is not required that the outbound authorization message include any new data elements that uniquely identify these transactions as "Payables Account" The Payables Account identifiers will be submitted to the acquirer processor in the outbound clearing message.

5. The data elements for these batch authorization files will be obtained from two primary sources:
   a. The inbound, buyer Transaction Information File (TIF)
      i. Sent to engine 502 from the Buyer ERP System
      ii. This file will likely be in an EDI or extensible markup language (XML) format
      iii. This file will include all data elements about the payment, with the exception of those data elements that are unique to "card" processing (i.e. card account number transaction amount, supplier related information, etc.).
   b. The 'card' related data elements that will be stored in the engine 502 and its associated registries and databases:
      i. These data elements will be appended, by the engine 502, to the inbound TIF, in order to create the outbound file in the unique acquirer processor format specifications.
      ii. a number of these static 'card' related data elements can be populated in the appropriate database directly. The other 'card' related data elements stored in the system will be populated by the buyer directly during buyer enrollment (e.g., card numbers, card expiration dates)
      iii. As needed, the acquirer processor will also append data to the record, upon receipt, prior to submitting for authorization.
      iv. In terms of data validation on the outbound file format: The requirement is that engine-related transactions meet the specifications defined by the acquirer processor. In one or more embodiments, the operator of engine 502 will not do additional edits on the file (such as associated with standard MasterCard BankNet® services (or other virtual private network)/GCMS (MASTERCARD GLOBAL CLEARING MANAGEMENT SYSTEM) edits). Again, engine-related transactions only need to meet the specific criteria of the acquirer processor—interfacing with the acquirer processor like a merchant POS would interface.

Comments will now be provided regarding the delivery process and frequency:
1. In one or more instances, the engine 502 will send files to each acquirer interface in batch format; the engine 502 need not support real time authorization processing (but optionally can)
2. The engine 502 will be able to create batch files using both of the following scenarios (the acquirer processor will select which batch scenario better meets their needs—buyers, in this example, will not have the option to select a batch scenario). The two scenarios are required because of the different ways acquirers handle the parsing and routing of the incoming files:
   a. One batch file that contains all merchant activity for each acquirer processor
   b. A individual batch file for each merchant/supplier for each acquirer
3. The batch authorization files will be built continuously by the engine 502, based upon the incoming TIF Files—24 hours a day, seven days a week, including holidays. If there is a limitation to the file (e.g. number of records, size etc.) the transaction will be added to the next possible batch
4. Batch authorization files will be sent from electronic payment apparatus to acquirer processors at intervals to be determined between operator of engine 502 and the acquirer processor. Batches are required so that system overloads are avoided.
5. The batch authorization files will be sent to acquirer processors using, by way of example and not limitation, existing MasterCard Global File Transfer (as discussed elsewhere herein) systems and protocols
6. Other considerations related to the process of delivering outbound authorization files to acquirer processors are as follows:
   a. In a single day transactions are sent to engine 502 from multiple buyers
      i. some buyers share the same issuing banks for authorization
      ii. some buyers do not share the same issuer banks for authorization
   b. The buyer transactions are for multiple suppliers/merchants
      i. some suppliers share the same acquiring processor
      ii. some suppliers do not share the same acquiring processor
   c. acquiring processors who performed the original authorization may or may not be responsible for supporting the clearing/settlement of those transactions; while rare, certain suppliers may have different acquirer processors for clearing and settlement. In this scenario, the engine 502 will be required to transmit the authorization logs received from the authorization acquirer processor to the appropriate clearing acquirer processor.
7. In one or more embodiments, scheduled payments will not be used; payments will be processed as they are received in the engine 502.

The acquirer processor will transform the outbound authorization file from engine 502 into an ISO8583 authorization record for a credit card purchase. Specific requirements are as follows:
1. Message is Rejected by Acquirer Processor:
   If the outbound file does not meet the acquirer processor specifications, the acquirer processor will issue a 'Reject' message back to the electronic payment apparatus 102. This message can be in an acquirer-specific format. Specific requirements will be defined for each acquirer.
   a. This reject message will be presented to the buyer as well as internal administrators in a common format with all the necessary related transaction information.
   b. The message will be presented in the form of an alert; presented both on an alert screen as well as in email format If the email message is rejected—the pertinent business owner and administrator will be notified to contact the buyer and update their information.
   c. Customer support will work with the buyer and the acquirer processor to determine the reason for the rejected outbound file.
   d. Note: In addition to file format errors, it is possible that the acquirer may also reject the outbound file due a transaction amount exceeding a particular credit limit with a supplier. These credit limit issues can be addressed directly with acquirers
   e. Regardless of the nature of the alert the engine 502 will always send an alert to the buyer and to the administrator. All reject messages will be stored in the engine 502
2. Message is Accepted and Submitted for Authorization:
   a. Acquirer processors will submit 0100 authorization requests upon receipt of each authorization batch file (specific service levels can be defined as appropriate)

b. The authorization response message, returned to the acquirer via the issuer processor, will be transmitted back to the engine 502 c. The engine 502 will need data translation engine functionality to format the various acquirer response messages back into a standard defined format i. For example, each acquirer may have different response codes which will need to be translated into one, single response code set ii. The reason for translating the response message to a standard format is two-fold:

1. Such that the engine 502 can provide "auth response" detail back to the buyer/administrator in a single, standard format 2. Such that the engine 502 can store the authorization detail in the engine 502 database in a single, standard, normalized format d. If the authorization response is something other than an "Approval" (e.g., "Decline," "Call Referral Pick Up")—this will be presented back to the buyer/administrator via an "alert" (and via email per appropriate 'alert' procedures).

There are two possible scenarios for clearing transactions to be processed for payments with engine 502. In scenario one, after authorization completes, the acquirer processor generates the clearing file without further interaction from the engine 502. For this scenario to take place, the acquirer will have had to receive all of the necessary fields from engine 502 in original authorization file submission. This is the preferred scenario as it limits the engine 502 from only having to process one file. In scenario two, after authorization completes, the engine 502 generates a clearing file, in the format of the acquirer processor, for those authorization transactions that have been returned with an 'approval code.' Declined or rejected transactions will not be included in the clearing batch for that particular day. This is the less preferred scenario as it requires engine 502 to send two files versus one file. The requirements below assume the second scenario whereby the engine 502 will be required to submit a clearing file to the acquirer processor.

Comments are now provided on the outbound clearing file format:

1. The engine 502 will deliver one consolidated, batch, clearing file to each acquirer processor at intervals to be determined by the operator (e.g. once per day, automatically as authorization responses are returned)—depending on the acquirer requirements. If the acquirer is flexible, then clearing will be processed with the next available clearing window.

2. The format of each clearing file will meet the unique specifications as defined by each acquirer processor interface 3. The entire clearing file will be generated from data maintained by the engine 502. No additional data will be required from the buyer in order to generate the outbound clearing file a. The engine 502 will have maintained the necessary data elements from the inbound payment instructions files along with the stored electronic payment apparatus data, in order to meet the requirements of the outbound clearing file b. appropriate data elements can be contained within the outbound clearing file c. The outbound clearing file can also contain the appropriate data elements that will be utilized to uniquely identify Payables Account transactions. These data elements can include, for example, a transaction category indicator and a partner ID code.

In one or more embodiments, the engine 502 will transmit one single, consolidated, batch clearing file to each acquirer processor, at the close of each processing day, and the file will be delivered to each acquirer processor interface(s) at defined time(s) each day.

In terms of the clearing response from the acquirer:

1. The acquirer processor will return an "Accept" or "Reject" message back to the engine 502 based on the file meeting (or not meeting) the acquirer processor specifications.

a. The message can be rejected both as a whole or some of its components. If a record is rejected—buyer and administrator will be notified with the proper information (reject reason) via e-mail alert and via the portal 664 b. Rejected transactions will be re-presented for clearing with the next possible clearing batch. The engine 502 will automatically add those transactions to the next batch. If the transaction is rejected again—the system will notify the buyer of the failure.

2. After the clearing batch successfully clears to the issuer, in the exemplary embodiment, the acquirer will not be sending any acknowledgement of successful clearing/settlement of the transaction.

An appropriate payables account indicator can be provided, and appropriate provision can be made for:

a. Chargeback rules, fraud rules, authorization credit limits on the acquirer side and the like.

b. "Payables account" field can be mandatory in the "auth" and "clearing" messages and acquirers can be asked to support it.

4—Outbound from Electronic Payment Apparatus—EFT Processing

The engine 502 will typically perform the following functions:

1. Collect and validate company and bank profile information via enrollment application;

2. Acquire payment order and remittance advice (transaction instruction file) detail from payers through integration with ERP systems;

3. Translate inbound transaction instruction files into outbound payment instruction files (PIFs) for settlement with ODFIs.

4. Store and display payment order and remittance detail in engine 502 for end-user viewing and analysis.

5. Route PIFs to the appropriate ODFI using secure transport for settlement through electronic payment networks.

Further details will now be provided with regard to item 5. Reference should now be had back to FIG. 5, and in particular, the encircled numeral "6" therein. Assume that engine 502 has loaded and cleared TIFs from ERP 506. Prior to reformatting as an ACH-CCD record, the electronic payment apparatus will need to recognize the payment transactions as a non-card EFT transaction. Non-card EFT transactions are settled using bank routing information for both payers' (debit account) and their suppliers (credit accounts) using an EFT network, in this case the Automated Clearing House (ACH). The electronic payment apparatus needs to edit the inbound TIF to determine if transactions are to be routed EFT (or card). The electronic payment apparatus will determine that it is an EFT transaction (in this instantiation) based on the following business rules: (1) Supplier is to be paid with EFT based on supplier registry, and (2) Inbound TIF includes originator (payer) DDA fields. The electronic payment apparatus does this by matching Supplier Tax ID and Site ID (or other appropriate identification) from the supplier registry 514 to the same information contained in the inbound TIF.

The TIF may contain bank routing information. In the case where the TIF contains bank routing information for suppliers, the electronic payment apparatus should overwrite the data with the routing data stored in the Supplier Registry 514. Process flow for identification of inbound EFT transactions can proceed as follows:

1. Inbound File received from ERP
2. electronic payment apparatus checks appropriate fields for data
3. electronic payment apparatus checks Payee Tax ID, Payer Tax ID, and ERP Site ID and references supplier registry 514 in order to append necessary routing data.

The system will perform file level and transaction level edits to the TIF. When a file passes all edits, the electronic payment apparatus will consider all transactions as being cleared for processing. Transaction routing can then follow. Payment exceptions occur when a TIF fails an edit. If any edits fail at the transaction level, those transactions will be placed in exception. All transactions that pass edits will be cleared for processing. The payer will be notified via an email alert of the transaction rejection and reason(s). The payer will need to 'resume' or 'resubmit' the transaction. Payment exceptions and management for inbound files may fall into the following categories:

1) Mandatory fields with no data/value
2) Duplicate file (Results in message/notification to payer)
3) Inactive account edits
4) Payments where the Site ID or Supplier Tax ID has not been found (discovered during data matching and translation process)
5) Fails based on user configuration.

For all transactions that go into exception, the payer will be notified both via the GUI 664 and with an email. Payers will be instructed to 'resume,' 'resubmit,' or 'void' the specific payment(s) in exception before the electronic payment apparatus creates the outbound PIF for transmission of that payment to ODFI. In addition to 'resume,' end-users will have the ability to 'void' a transaction. End-users must be granted permission to either resume or void payment exceptions by the system administrator. If the end-user has permission, they will see a 'Resume' or 'Void' button on their GUI. For 'resubmit' errors, the user will be required to resend a TIF originated from their ERP. End-users (payers) can void any payment in exception, but can only resume payments in 'Held' status. In the GUI, users will be able to click on the payments in exception to view an audit trail. If the end-user resumes payment before the file is released to ODFI, then the entire payment batch will be transmitted to ODFI. If the end-user resumes after 'cleared' payments are released to ODFI, then new payment instructions will be transmitted the day the payment was 'resumed.'

The inbound file will be modified and re-formatted in the electronic payment apparatus transaction engine 502 as follows:

a. Inbound TIF received from payer ERP 506;
b. TIF payment instruction and remittance records are stored in the electronic payment apparatus (for later use by supplier 526 for transaction reconciliation);
c. Routing data already stored in the electronic payment apparatus (supplier registry 514) is appended to the EFT transaction. EFT routing data includes appropriate fields.
d. Electronic payment apparatus acquirers Payment Reference ID from TIF, and places it in the outbound PIF.
e. electronic payment apparatus generates outbound payment instruction file (PIF) and delivers to ODFI 516.

In order to identify the transaction as EFT, the inbound file from the ERP can include the Payer's account information at the ODFI.

Once TIFs have been cleared for outbound processing, the electronic payment apparatus will generate an outbound batch file for transmission to ODFI 516. The outbound file will be transmitted to the ODFI once it is cleared by the electronic payment apparatus. The file will not be netted against other ODFI outbound files from other payers prior to transmission. If the same payer submits files with different batch names/numbers on the same day to the electronic payment apparatus for transmission to the ODFI, the electronic payment apparatus will treat those as individual transactions. Processing to the ODFI should be end-of-day for all cleared transactions, at a minimum. However, the electronic payment apparatus should set multiple processing times (e.g., four times a day) in order to minimize processing float. Implementation specialists can use processing timeframes/cut-offs for a Payer's ODFI to determine the optimal time for the payer to send the TIF for processing in the electronic payment apparatus.

The electronic payment apparatus will push files to the ODFI using secure FTP, for example, using one or more of following methods:

Secure FTP/iFTP (FTP over SSL requiting the RFC 2228 standard client, known to the skilled artisan and readily adapted for inventive purposes, given the teachings herein), and Connect Direct/NDM (well-known file transfer programs available form Sterling Commerce of Columbus, Ohio, USA) or MasterCard Global File Transfer.

Files will be automatically transmitted (unattended) to ODFI based on configurable processing schedules established in the electronic payment apparatus. Each outbound file delivered to the ODFI will consist, for example, of a maximum of 5,076 characters, based on 50 entry detail records per batch. The electronic payment apparatus will store the outbound file delivered to ODFI in ACH-CCD format for 30-days (or other predetermined period).

ODFIs will send confirmation files to the electronic payment apparatus to acknowledge successful receipt of the PIF transmission. This acknowledgement only confirms the ODFI's receipt of the file via a standard acknowledgement. This acknowledgement does not imply that the file was successfully processed through the clearing house and received by the supplier's bank, i.e., the ODFI will not send a confirmation file back to the electronic payment apparatus (in other embodiments, the ODFI can also send back a transaction confirmation file to the electronic payment apparatus). If is not expected that many, if any, transactions would be rejected by the ODFI. However, if files are rejected, the ODFI would notify the electronic payment apparatus customer support and its treasury contact at the payer to resolve the issue. To support ODFI management, the electronic payment apparatus will include information about the payer and the ODFI relationship during implementation and provide customer support for file testing and post-implementation operations. In some instances, problematic transactions need not be displayed as 'rejected' in the electronic payment apparatus portal 664 because (a) the electronic payment apparatus does not receive electronic notification of rejected transactions from ODFI, and (b) transactions require immediate action and resolution by customer support.

The electronic payment apparatus system will track all payments it disburses. The electronic payments will be tracked in a "Payment Summary Table." This table will present all past, present, and future payment records. Payment history records will be retained online for 2 years and off-line records for 7 years (or other pre-determined periods—indeed, in general, specific time periods mentioned herein are exemplary and not intended to limit the invention to the specific time periods mentioned). Appropriate reports ("canned" or customized) can be made available by portal 664.

5—Enrollment/MVF Management

The master vendor file management work stream encompasses, for example, the process beginning with the inception of a corporation's Master Vendor File (MVF) through to supplier enrollment efforts within the electronic payment apparatus. These requirements highlight the process flow(s) and procedures followed for a buyer who is implementing electronic payment apparatus functionality. A portion of this process, specifically the acceptance match, can advantageously be performed by utilizing a data warehouse matching web application, referred to herein as "AM" for "acceptance matching." Please refer to the above Table 1 and accompanying discussion for the currently preferred approach to AM. In addition to using a specific AM application, a semi-automated Microsoft Access® (registered mark of Microsoft Corporation, Redmond, Wash., USA) database (or a more sophisticated database) that includes several data tables, macros, code modules, and queries can also be utilized.

Referring back to encircled numeral "1" in FIG. 5, and to FIG. 6, in one or more embodiments, an implementation specialist 670 executes the following steps to ultimately produce the desired acceptance report. First, a Master Vendor File (MVF) is requested from each prospective Buyer's ERP/Payables System. Second, the implementation specialist defines the mandatory field requirements of the MVF. As noted above with regard to Table 1, in a currently preferred embodiment, these are the DBA Name, Street Address, and Province/State Code fields. In an alternative embodiment, they could be, for example:

a. Vendor Id (internal to buyer's system)
b. Merchant (DBA) Name
c. Street Address
d. City
e. State
f. Postal Code Third, the implementation specialist prepares a file suitable for input into AM by using, e.g., Microsoft Excels® (registered mark of Microsoft Corporation, Redmond, Wash., USA) software to copy/paste fields into the AM-defined layout, and then saving the file as a comma separated values file (.CSV file extension). The presently preferred input file includes all ten fields as set forth in Table 1 above. In another non-limiting example, the AM input file format could be in the following order: (the tool could require, by way of example and not limitation, a file with 9 (or other appropriate number, e.g., 10) columns, even if the columns are blank).

a. Merchant (DBA) Name
b. Street Address
c. City
d. State
e. Zip
f. Tax ID *
g. Acquirer Merchant ID *
h. Telephone Number *
i. Fax Number *
* Optional Fields Fourth, the implementation specialist uploads the input file into AM through a webpage. If the file contains more than 50,000 records, the specialist uses a utility to split the file into multiple 50,000 record files. AM limits input files to a maximum of 50,000 records. Fifth, once uploading has finished, the specialist chooses a set of the most applicable matching rules to apply during the match execution. Sixth, a match is performed and upon completion, the specialist uses a webpage in AM to create report of all vendors who accept, for example, MasterCard® payment cards, and of those, which ones have also accepted a PCard (corporate card) in the past. Seventh, this matched acceptance report is created in CSV format and contains the following fields ("File" and "DW" refer to the value that came in on the file and the value stored in the data warehouse, respectively):

a. Vendor/Location Id
b. File DBA Name
c. DW DBA Name
d. File Street Address
e. DW Street Address
f. File City
g. DW City
h. File State
i. DW State
j. File Postal Code
k. DW Postal Code
l. File Tax Id
m. DW Tax Id
n. File Telephone Number
o. DW Telephone Number
p. DW MCC Code (or other category code assigned by an operator of a payment card network or the like)
q. DW Interbank Card Association (ICA) Code (used to identify a customer of a payment card network, or the like)
r. DW Acquirer Merchant Id
s. DW PCard Acceptance/Data Rate Level Eighth, after creating the match report from AM, the specialist puts the file into a specified directory, and then executes a macro in, for example, Access® (registered mark of Microsoft Corporation, Redmond, Wash., USA) database software. This macro creates a new report, appending the following additional fields to the existing report. These new fields provide standard industry code (SIC) information as well as associated acquiring bank/processor data by vendor.

a. DW MCC Name
b. DW MCC Classification
c. DW Merchant Bank Name
d. DW Processor
e. DW Platform Ninth, in addition to the appended fields, the Access® database also creates a summary of matched vendors by processor for each unique MVF run. Furthermore, each summary analysis of vendor/processor information unique to the given buyer is consolidated into an overall database table for view and retrieval by the implementation specialist for supplier segmentation efforts going forward.

Tenth, the match results are sent back to the implementation specialist and sales representative (if applicable), to analyze for accuracy with the client and to begin targeting the initial group of suppliers. Eleventh, if a member/member representative is involved in the sale, the match results are shared with that representative and the issuer working with the client to aide in discussions surrounding the card program issuance and supplier segmentation options. Twelfth, the final vendor output file, which includes a match against existing program suppliers, is presented to the client with card program and supplier segmentation recommendations. Card program and supplier segmentation recommendations are usually provided by the issuer. Thirteenth, it should be noted that matches are sometimes only run for the purposes of a sale. For example, a sales representative may obtain an MVF from a prospective client to provide back to them the percentage of their vendors who are already acceptors of MasterCard® (or other) payment cards and those with acquirers already qualifying for straight through processing (STP), to portray the immediate benefits they could receive if they agree to participate in the program. Straight-through processing may be defined, in this context, as 'payment file originated from Buyer payables system to Supplier's settlement account and includes remittance data without manual intervention'. Fourteenth, if the client is enrolling in the program, supplemental data elements identified in the match result set of each of their vendors are used to pre-populate the supplier enrollment screens, including DBA (doing business as) Name, Street Address, City, State, Zip, Phone, Tax ID, Merchant Bank Name and Acquiring Merchant ID. This information can be passed on to partners in, for example, an Excel® spreadsheet (registered mark of Microsoft Corporation).

Appropriate vendor data, and, for example, a summary of matched suppliers by processor, obtained from each individual MVF run, can be included. Key pieces of data that are complied (and may be provided, for example, in an e-mail) include:
  a. Total number of matched suppliers
  b. Total number of matched suppliers by processor
  c. Percent of total that each supplier/processor combination represents
  d. Results are displayed in a descending order, with the largest number of suppliers at any given processor listed first.

Furthermore, each summary analysis of supplier/processor information unique to a given buyer is consolidated into an overall table for view and retrieval by the implementation specialist 670, for supplier segmentation efforts going forward.

Figure 8:
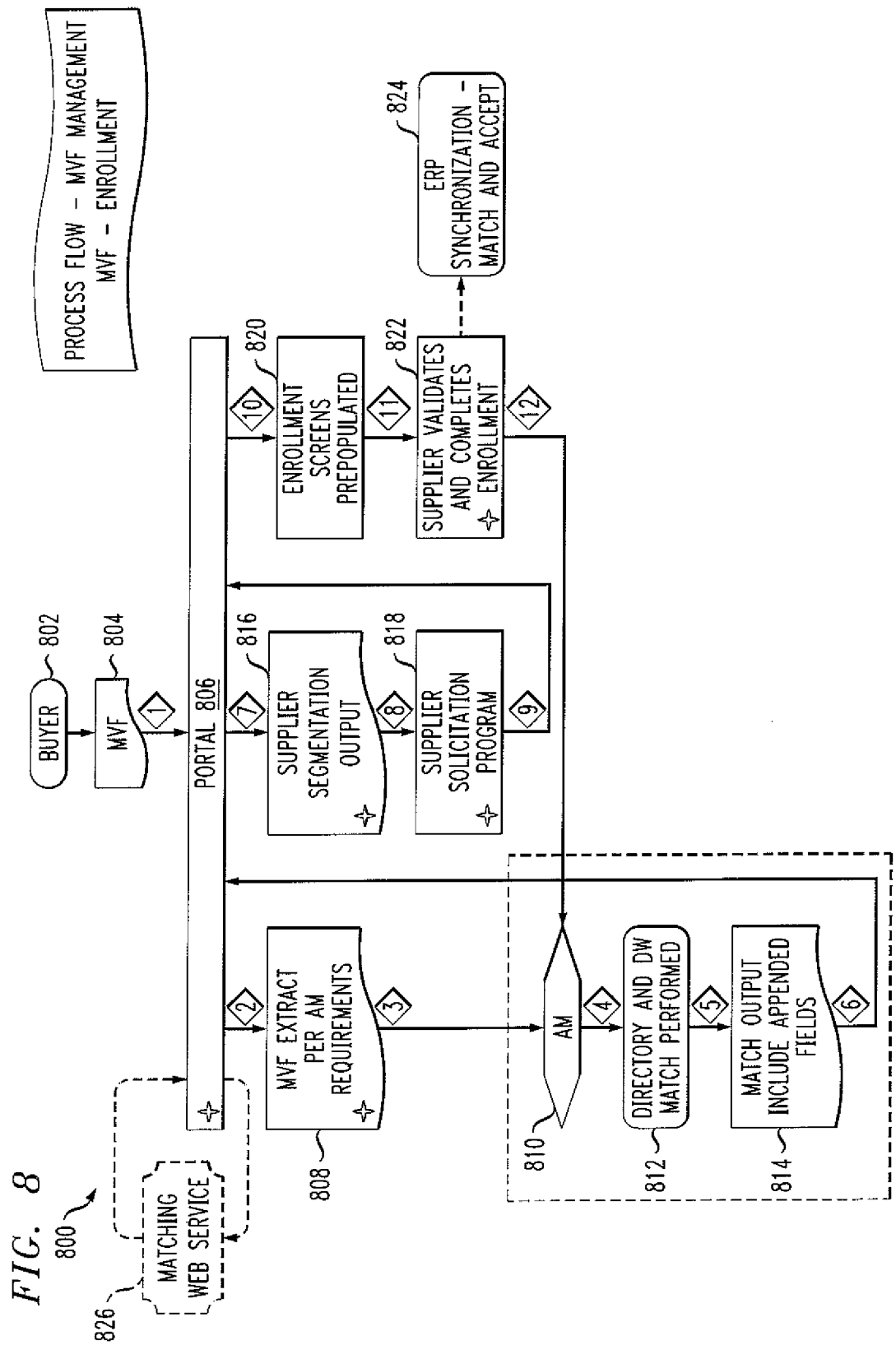
FIG. 8 shows one specific manner in which enrollment may be carried out.

FIG. 8 shows one specific manner 800 in which enrollment may be carried out. The numbered paragraphs refer to the numerals enclosed in diamonds. Starred blocks may be accomplished via manual intervention. Dashed lines indicate steps that may be accomplished outside engine 502. The matching web service 826 is a utility used to communicate messages between the electronic payment apparatus system and AM, such as the status of a match request. Additionally, the electronic payment apparatus can request a change of priority or cancellation through this service.
1. Buyer 802 submits/uploads MVF 804 through secure web portal 806
2. Implementation specialist will initiate an automated process to manipulate the MVF 804 into the standard format, per AM requirements, saving it a csv file.
3. Implementation specialist sends the AM the reformatted MVF 808 and a directional (instructional) file to the match tool AM 810, via GFT (Global File Transfer).
4. Match is performed in AM against the data warehouse 812 to identify existing suppliers in the directory and to determine card acceptance.
5. Supplemental fields from the data warehouse are appended to the match results and compiled into a single match output document 814.
6. A complete MVF, with applicable appended match data, is sent back to the portal 806 via GFT.
7. A portion of the match results are reformatted into a supplier segmentation output report 816. There can be two separate layouts, one for use by the implementation specialist and another including different fields to be viewed by the Buyer).
8. The segmentation output report 816 is available for download by the implementation specialist only. The results may be reformatted and distributed to applicable parties such as the buyer and an issuer: representative if applicable, and supplier segmentation strategies are developed, as at 818.
9. Buyer selects suppliers to enroll for card and/or EFT payments. These suppliers are flagged and solicitations are sent out.
10. Enrollment screens for selected suppliers are pre-populated with specified match result fields, as at 820.
11. Supplier completes enrollment agreement and validation of key data elements, thus the enrollment is complete, as at 822.
12. Changes made during enrollment are updated in the electronic payment apparatus supplier directory, as at 824. Additionally, if any key merchant fields are changed by the supplier during enrollment, those fields will be sent back to the data warehouse in csv format, via GFT.

Figure 9:
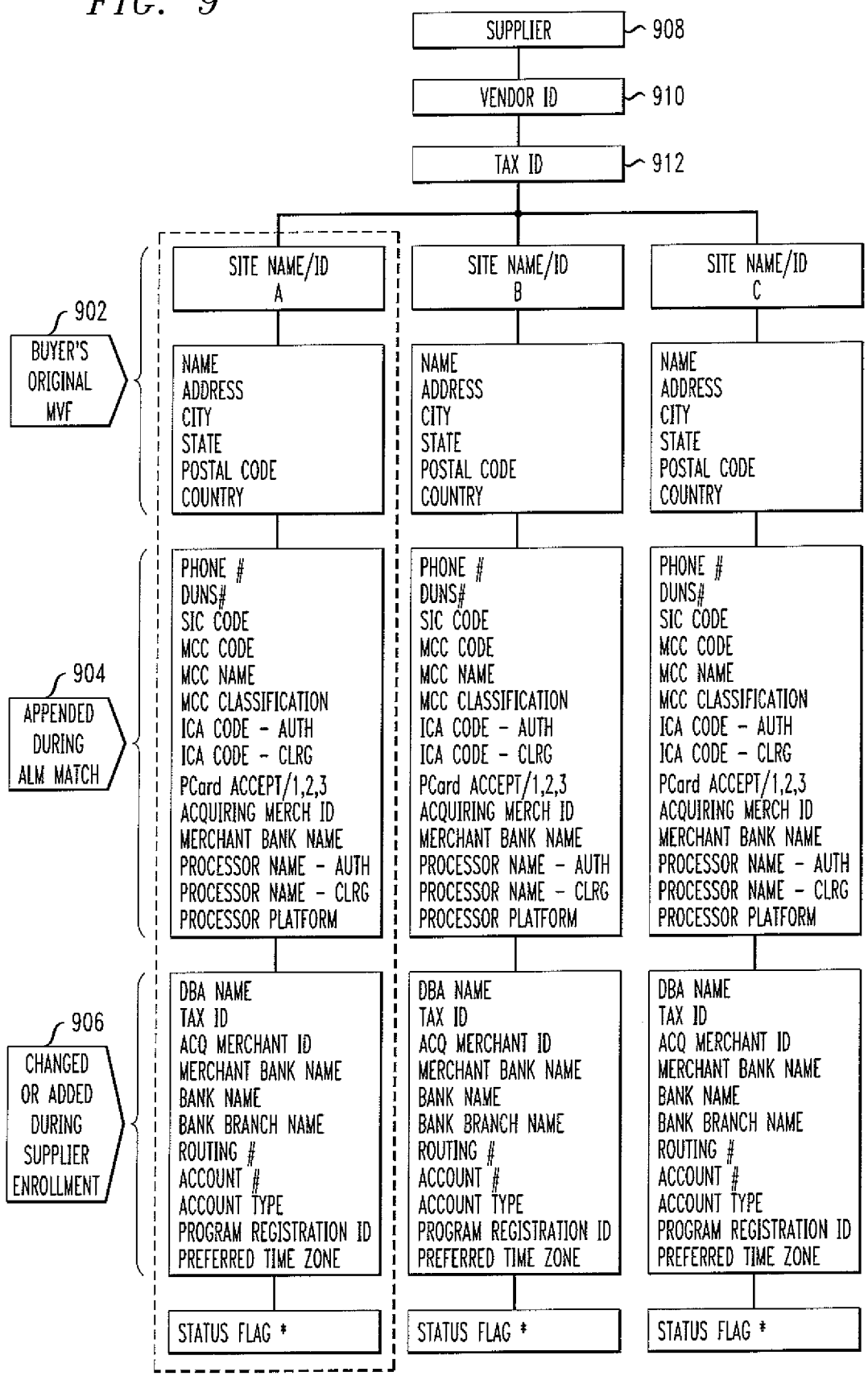
FIG. 9 shows a sample supplier layout.

FIG. 9 shows a sample supplier layout in a directory accessible to engine 502. For the asterisk "*" status flag, expected values include: enrolled and accepted, enrolled but not accepted, not accepted, vendor declined. The dashed line represents the record stored for a supplier, uniquely defined by Site ID and the corresponding bank information associated with it. For example, Site ID A would contain "remit to" information associated with an EFT transaction, where Site ID B might contain PCard specific information such as "Acq Merchant ID." The material in the original MVF is shown at 902, the appended information is shown at 904, and material that may be changed or added at supplier enrollment is shown at 906. Supplier 908 is shown as identified by Vendor ID 910 and tax ID 912, but these are merely examples of many possible forms of identification, as discussed elsewhere herein. The skilled artisan is familiar with all the fields in FIG. 9; SIC means standard industry code/standard industrial classification.

Figure 10:
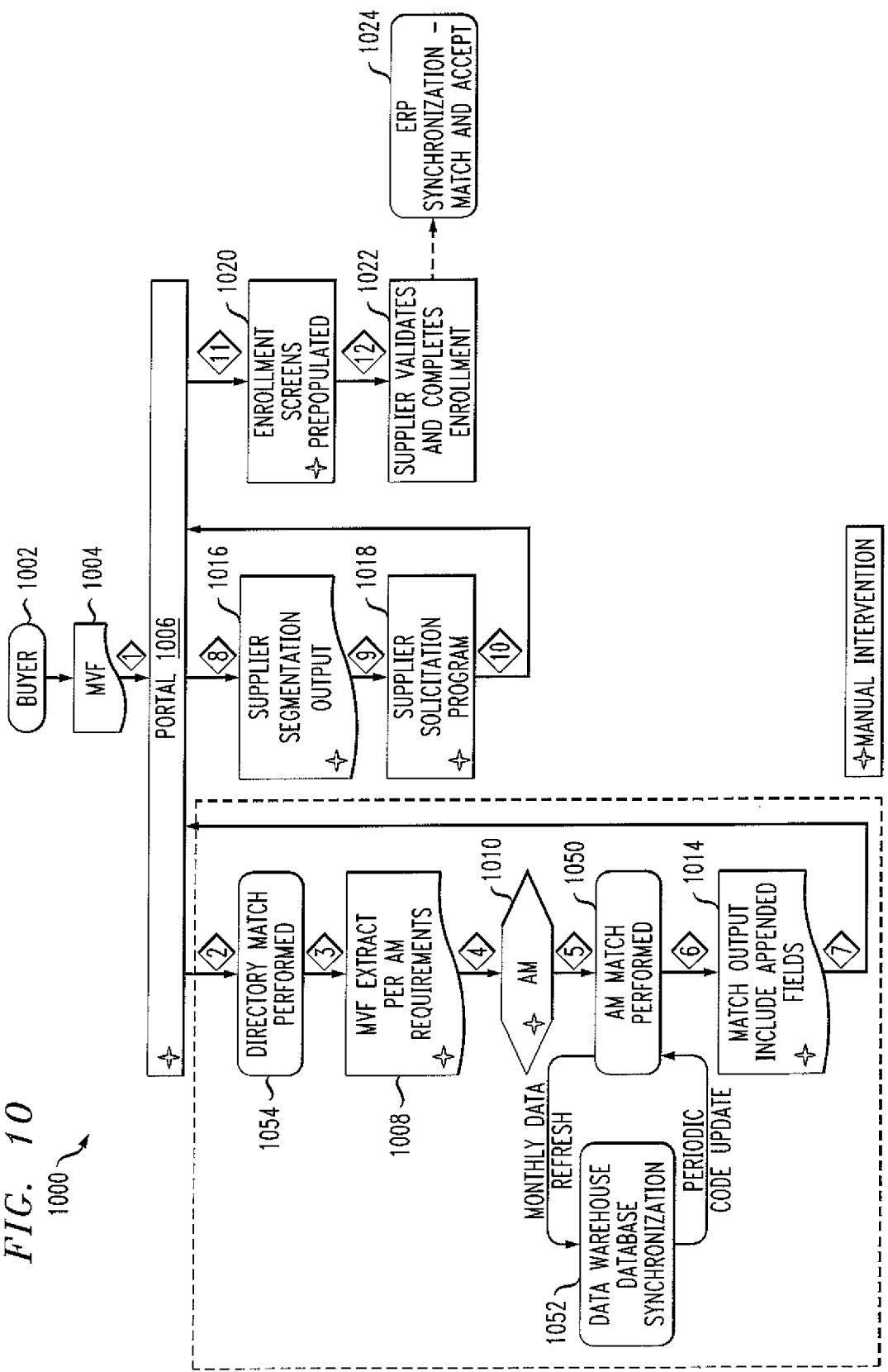
FIG. 10 shows another specific manner in which enrollment may be carried out.
Figure 11:
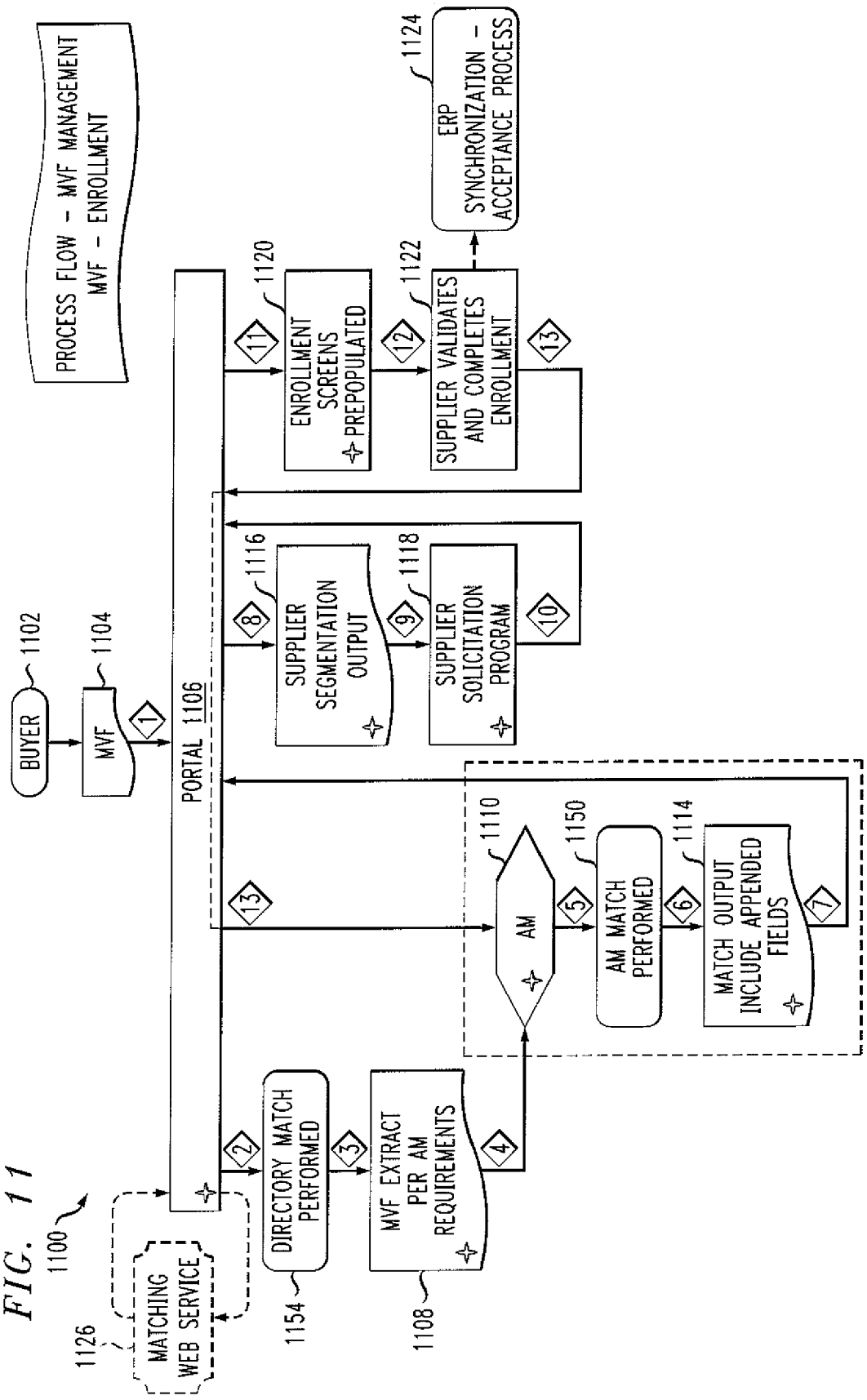
FIG. 11 shows yet another specific manner 1100 in which enrollment may be carried out.

FIG. 10 shows another specific manner 1000 in which enrollment may be carried out. Note that FIG. 8 shows a currently preferred approach and FIGS. 10 and 11 show exemplary alternatives. The numbered paragraphs refer to the numerals enclosed in diamonds. Starred blocks may be accomplished via manual intervention. Here, steps are performed within engine 502.
1. Buyer 1002 submits/uploads MVF 1004 through secure web portal 1006.
2. Implementation Specialist executes internal match 1054 to identify those suppliers already enrolled. Exact matches are identified by matching on federal tax identifier, (required field in buyer MVF requirements), and a secondary partial match verification on either address or name.
3. Implementation Specialist manipulates the unmatched portion of MVF into the AM required format, using Microsoft Excel® or Access® (depending on file size) and saving as a csv file.
4. Implementation Specialist sends the unmatched, AM reformatted portion of the MVF 1008 and a directional (instructional) file to the match tool AM 1010, via GFT (Global File Transfer). This step may not be necessary in some instances where AM functionality is present within the engine 502 and/or portal 664.
5. At 1050, match is performed in the electronic payment apparatus against the latest copy of the merchant database for, e.g., MasterCard® card acceptance. By way of example, a file transfer (Global File Transfer) of the merchant database could be made once a month.

6. At 1052, supplemental fields from the data warehouse are appended to the match results and compiled into a single match output document 1014.
7. The match result subset will then be recompiled with all corresponding data in the original MVF, as well as the electronic payment apparatus directory matched portion obtained in step 2 and the unmatched portion of the original MVF. The field used to join all subsets together is, for example, a Merchant Market Hierarchy ID, assigned during the AM match. The electronic payment apparatus supplier directory is populated and a consolidated report is generated and made available for viewing by the buyer.
8. The consolidated match results report is viewed by the implementation specialist and the buyer in electronic payment apparatus as per block 1016. Results are reviewed in conjunction with issuer and supplier segmentation strategy is developed.
9. Buyer 1002 selects suppliers to enroll card and/or EFT payments.
10. Selected suppliers for solicitation in block 1018 are flagged and solicitations are sent out.
11. Enrollment screens 1020 for selected suppliers are pre-populated with specified match result fields.
12. Supplier completes validation of key data elements at 1022 and the enrollment is complete at block 1024.

FIG. 11 shows yet another specific manner 1100 in which enrollment may be carried out. The numbered paragraphs refer to the numerals enclosed in diamonds Starred blocks may be accomplished via manual intervention. Here, steps are performed within engine 502, except that dashed lines indicate steps that may be accomplished outside engine 502.
1. Buyer 1102 submits/uploads MVF 1104 through secure web portal.
2. Implementation specialist executes internal match in block 1106 to identify those suppliers already enrolled in electronic payment apparatus directory, as at 1154. Similarity matches are identified by matching on Federal Tax ID and all address fields, (Street Address, City, State and Zip).
3. Implementation specialist initiates the automated reformatting process to manipulate the unmatched portion of MVF into the AM required format as per block 1108.
4. Implementation Specialist sends the unmatched, AM reformatted portion of the MVF and a directional (instructional) file to the match tool AM 110, via GFT (Global File Transfer).
5. Match is performed in AM against the data warehouse to determine payment card (e.g., MasterCard® card) acceptance, as per 1150.
6. Supplemental fields from the data warehouse are appended to the match results at block 114 and compiled into a single match output document. Note that the aforementioned data warehouse can be operatively coupled to apparatus 102 including engine 502 and/or portal 664—FIG. 17 and accompanying text provide exemplary details of computer system functionality.
7. Only the matched portion of the MVF, along with the applicable appended data, is sent via GFT back to the portal 1106.
8. Once back in the portal, this matched subset will be re-compiled with all corresponding data in the original MVF 1104, as well as the electronic payment apparatus supplier directory matched portion obtained in step 2. The fields used to join all subsets together are Vendor Id (original to the MVF file) and Merchant Market Hierarchy Id (assigned during the AM match). A consolidated report is generated.
9. The consolidated match report is available for download by the implementation specialist only. The results may be reformatted and distributed to applicable parties such as the buyer and an issuer representative if applicable, and supplier segmentation strategies are developed at 1116.
10. Buyer selects suppliers to enroll in electronic payment apparatus for PCard and/or EFT payments. These suppliers are flagged and solicitations are sent out as at 1118.
11. Enrollment screens for selected suppliers are pre-populated with specified match result fields, at 1120.
12. Supplier completes enrollment agreement and validation of key data elements at 1122, thus the enrollment is complete at 1124.
13. Changes made during enrollment are updated in the supplier directory. Additionally, if any key merchant fields are changed by the supplier during enrollment, those fields will be sent by OFT back to the data warehouse in .csv format.

Figure 12:
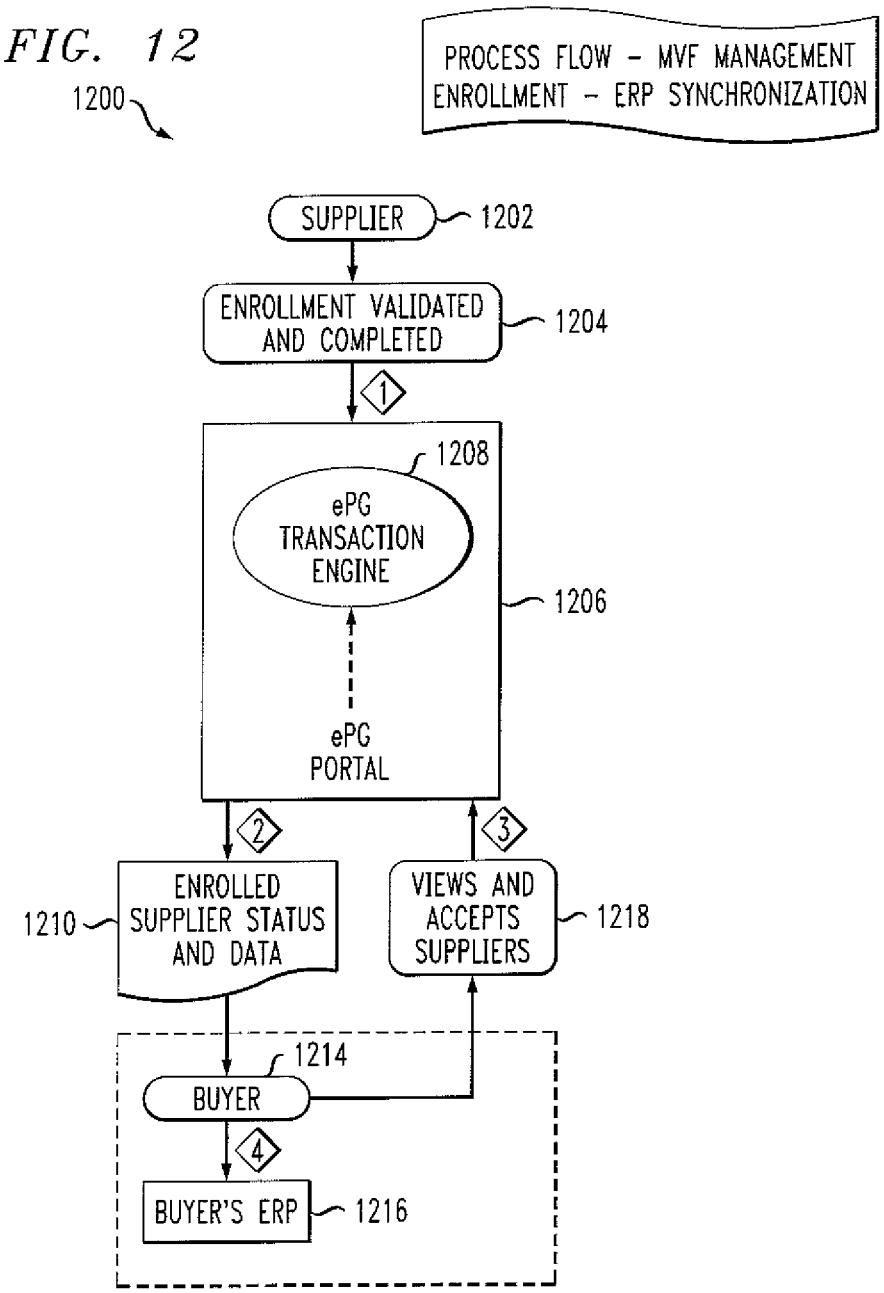
FIG. 12 shows further exemplary enrollment details.

A description will now be provided of the process beginning with the successful enrollment of a buyer's suppliers, through to the synchronization of pertinent data (that was updated during the supplier enrollment) back to the buyer's ERP system. The buyer will accept a new relationship with an enrolled active supplier within the electronic payment apparatus, however, the synchronization or movement of those suppliers to a new pay group within their ERP system is a manual process and is carried out outside of the electronic payment apparatus. The process flow(s) and procedures are those followed by a buyer to accept key data elements obtained during enrollment and synchronize them with those contained in his ERP system in order to successfully process P-Card and EFT payments through the electronic payment apparatus. Additionally, the electronic payment apparatus can to recognize and route payments by type, on incoming transaction instruction files from buyer's ERP systems. The following discussion is related to encircled numeral "2" and block 590 of FIG. 5. Consideration will be given to the process a buyer will follow to accept the new supplier's data within the electronic payment apparatus, as a result of enrollment, as well as the synchronization process which moves all applicable suppliers to new pay groups within the buyer's ERP system. Additionally, this process is required to provide the ability for the electronic payment apparatus to successfully recognize and route payments by type, on incoming transaction instruction files from buyer's ERP systems. Attention should now be given to FIG. 12. The dashed line represents steps in the process flow that occur outside of the engine 502. The numbered paragraphs refer to the arrows designated by the numerals enclosed in diamonds:
1. Supplier 1202 completes validation of key data elements within the enrollment portal 1206 of the electronic payment apparatus (including the engine, portal and registries) and the enrollment is complete, as at block 1204.
2. Buyer 1214 is notified of supplier's 1202 enrollment status and updated data elements in relation to each supplier, as per block 1210.
3. Buyer 1214 views and accepts newly enrolled suppliers within the system as per, block 1218.
4. Buyer 1214 moves newly enrolled suppliers 1202 into the proper pay groups within their individual ERP system 1216 per enrollment specifics. This step/process occurs outside the system, as shown by the dashed line.

6—Electronic Payment Apparatus Portal/Web-Site & Reporting Functionality

This section details the functional of the electronic payment apparatus web interface (portal 644) as well as the targeted end users' (primarily buyers and suppliers) interaction with the web portal 644. The electronic payment apparatus web portal provides end users with a web interface that includes a wide breadth of functionality to support businessto-business payment processes. The electronic payment apparatus web portal includes two main interfaces—the buyer portal and the supplier portal. A summary of exemplary web pages and functions within both interfaces follows.

Buyer Portal
a. Home Page
b. Payment Center
c. Supplier Maintenance
d. Reports
e. Alerts
f. Administration Supplier Portal
a. Home Page
b. Payment Center
c. Buyer Maintenance
d. Reports
e. Administration In this particular example, the system can create a user login credential (user id). It may not be repeated across users across all electronic payment apparatus co-brands (including across inactive users). The system assigns a user a temporary password when the user profile is created. A user may be assigned to more than one group by a user with authority to set up another user. A user who may set up a user may enter some information for the user, except for a secret question and answer which are entered by the end user himself only, and for system generated data elements such as user id and temporary password. Each time a new user is enrolled in the electronic payment apparatus, the system can advantageously validate his or her e-mail address.

The electronic payment apparatus portal can be made accessible via a suitable URL. The electronic payment apparatus can have a general section that will not require authentication to be viewed. The section will contain general information about the product, contact information and the log-in screen. The pages that may be part of this non-secure section include:
   Home page
   Contact Us
   Privacy Policy
   Public Supplier Directory (list and searchable)
Authentication to the site can be done in two ways:
   Basic Access Credentials
   Advanced Access Credentials
Basic Access Credentials
   Basic access credentials include user name and password. Both are known and controlled by user.
Advanced Access Credentials
   Advanced access credentials include user ID and PIN (both controlled by the user) and another credential not controlled by the user.

One or more instances can employ physical tokens which have numbers that are constantly changing.

If a user is assigned to a system function requiring advanced security credentials, and does not already have basic security credentials established, he will not be able to access any part of the system until he has received his advanced security credentials. If a user is assigned to a system function requiring advanced security credentials after he has established basic security credentials, the user may enter either his basic security credentials OR his advanced security credentials (once received) to access the system. Basic security credentials will be able to be utilized even if he is in the process of being assigned or has been assigned/activated advanced security credentials.

A user must correctly provide his security authentication credentials prior to being granted access to the system function requiring each level of security. A user should only need to login once to gain access to system functions. The system will preferably grant a user access to system functions to which he is assigned for those that meet the security level for which he has validly provided his security credentials. For example: a user may enter basic security credentials at login. He will be granted access to the functions he is assigned that require basic security credential authentication. If he is also assigned to system functions requiring advanced security credentials, the system will not in any way display those system functions to him if he has not provided advanced security credentials. If he validly provides advanced security credentials the system will display all system functions to which he is assigned (both those requiring basic security credentials and advanced). Navigations will not be shown for system functions to which a user has not be assigned or for which he has not provided the appropriate level of security credentials.

In this exemplary embodiment, the user must be associated with a valid electronic payment apparatus business partner in order to be panted any access. This relationship may simply identify for what company the user works and what role the user is approved for the electronic payment apparatus product (buyer, supplier support, etc). The electronic payment apparatus will default to either a predetermined standard or industry best practice to determine the syntax of the format of the user ID information for end users. Other appropriate security policies and procedures may advantageously be implemented.

A buyer company profile is initially established by an implementation specialist. The implementation specialist will enter all the information associated with the buyer profile—name, address, etc. A buyer user with the appropriate rights may update his company profile at any time. Some of the elements of the profile include, but are not limited to:
   Company legal name
   Company contact information (mailing address, billing address, telephone and fax numbers)
   Company type
   Others
E-mail notification will be generated to all suppliers associated with that buyer, to advise that their company information has changed. Buyer enrollment may be performed by the buyer or by an implementation specialist. Buyer payment profile information will be entered only by buyer users with the appropriate rights. Customer support and/or third parties will not be able to perform this service on behalf of the buyer. Buyers may enter multiple commercial cards (e.g. p-cards, fleet, etc.) to be used for payment. These commercial cards can be MasterCard®, or non-MasterCard® branded (e.g. Visa® or AMEX®).

As credit card information will not be considered part of the incoming PIF—the buyer must enter at least one commercial card into the electronic payment apparatus if they choose this form of payment. The card or cards in the electronic payment apparatus can be referenced in the Payments Instruction File (PIF) either by alias or by actual number. Credit card aliases will be defined by the buyer in the electronic payment apparatus system. Buyers can choose to assign an individual card for each supplier (site-id), however there has to be a primary card for payment that will be used for all suppliers that the buyer has not associated a card with. Additionally—one site-id cannot have more than one card associated to it from the same buyer.

Users from the buyer side with the appropriate rights will be able to update the stored card information in the electronic payment apparatus. These updates will be required if the card information changes. If the update is not done—any payment against the card may fail. Changes to the card information will not trigger any notification to the supplier. Changes to the card information will trigger a general confirmation e-mail to the buyer (without including any card specific data). Buyers will not be required to enter any EFT/DDA account information as these will be a required component of the incoming Payments Instructions File.

Buyers will be able to define different tolerance levels for each card. The parameters include:
 Maximum dollar amount for a payment
 Maximum dollar amount for a batch If buyers have registered at least one card with the electronic payment apparatus, they will need to provide the expiration date for that card. In addition, the electronic payment apparatus will monitor that date and send an alert to the buyer 45 days before the expiration date to notify them of the potential problem. The alert will be repeated again 30 days before the expiration, 7 days before the expiration and on the date of the expiration, for example.

The supplier directory will have two different views—a public and a private. In one or more embodiments, the supplier directory can be an end-user view of data contained in the supplier registry 514. The public view will be available to all users and will contain general information for each supplier. The private views will be associated with each buyer and will contain proprietary buyer related information—such as supplier alias.

Any authenticated electronic payment apparatus user may view the public supplier directory. This directory should be listed by supplier electronic payment apparatus default name in alphabetical order. It may also list suppliers by category (retail, hotel, etc). Users may search for and view suppliers. An enrolled buyer may search for his private suppliers by the name as assigned to the supplier by the buyer via his MVF. Some of the fields to search on will be: Name, Vendor ID, Merchant ID, MCC Code, Tax ID, Address, City, State, Country, Supplier Site ID, and the like.

Supplier solicitation will be a buyer-initiated process or implementation-specialist-on-behalf-of-buyer-initiated process. The purpose of the process is to invite suppliers that currently do business with that buyer to enroll in the electronic payment apparatus program. Buyers will have the opportunity to identify the set of suppliers for targeted enrollment solicitations—via an electronic payment apparatus solicitation screen. The data that is captured and retained via the "Matching Process" will be utilized by the buyer in support of these solicitation efforts. Suppliers identified in the process that are not chosen for solicitation will be purged after 18 months. In addition—the buyer or implementation specialist may search from a buyer's potential supplier list to select targets for solicitation. The buyer may also select a public supplier for which to create a solicitation request. The solicitation may occur in two ways:
 Via the electronic payment apparatus
 Offline/directly from buyer Offline solicitation templates will be available to buyers in the electronic payment apparatus, however—the offline solicitation will not be sufficient to enroll a supplier. Each supplier must, in this example, have electronic payment apparatus credentials in order to enroll and be linked to the specific buyer. The Buyer can request temporary credentials from Customer Support for his Suppliers, or ask that Customer Support handle the off line solicitation. Customer Support will flag these suppliers. Customer support will request these temporary credentials within the electronic payment apparatus for these selected suppliers. These enrollment codes are sent to the buyer so that the buyer can use them for the offline solicitation. The temporary credentials can then be sent to the suppliers (by the buyer), with a link to the pre-populated data. When the supplier clicks the link, the enrollment process begins.

The user will identify solicitation details and the electronic payment apparatus system will be responsible for sending solicitation emails. Users may future-date solicitations to be sent. If the solicitation has not been sent (but is scheduled for a future date), users will be able to make changes. It solicitation templates are not customized—the electronic payment apparatus will default to a standard template.

Buyer may choose to solicit a supplier with multiple templates. A new request to a new, or the same, contact may be created for the same supplier company. A new email will be sent with new temporary credentials. Old credentials will be available and may be used within the set time flame. Solicitation emails will be associated with the supplier company and the contacts to which solicitations are sent will be tracked. Solicitation emails will allow the addition of personalization.

Both buyers and support personnel will be able to manage the solicitation process and monitor the status. Implementation specialists or buyers may view (by buyer) a list of solicitation requests that have been created. Users may search for requests by date scheduled and/or status and/or supplier company and/or contact email address.

Statuses for solicitations will include:
 Enrolled and Accepted—Supplier enrolled and been accepted by buyer
 Enrolled Not Accepted—Supplier has enrolled but not accepted by buyer
 Vendor Declined—Supplier has responded to the solicitation and has declined enrollment
 Not Accepted—Supplier has not responded to the solicitation in the given time flame. The temporary credentials have expired.

All solicitations will require the supplier to receive temporary credentials via email and log on to the electronic payment apparatus; therefore, all solicitations are traceable—whether or not the buyer chooses to use one of the electronic payment apparatus templates.

Buyers/implementation specialists have the ability to close a solicitation if the supplier verbally tells the buyer they do not wish to participate. This information will allow the buyer to track the suppliers that have opted out of the electronic payment apparatus, eliminating the possibility of re-soliciting a supplier that has opted out. This supplier may still be solicited by another buyer. The user may view solicitation details about the type of template that went to each supplier (in one or more embodiments, online only), as well as the date of the solicitation and the response time by supplier. The electronic payment apparatus will not store the actual e-mails, however some key solicitation metrics include:
 Template success ratio (For each template how many requests were completed, vs. declined and not responded)
 Average time for the 'initiated' status
 Percent of requests enrolled and Accepted
 Percent of requests enrolled but not Accepted
 Percent of requests vendor declined If an existing electronic payment apparatus supplier is sent an invitation to enroll by a buyer, the supplier does not have to create new users. A shortened acceptance process will be followed by the supplier. Supplier users who respond to the solicitation must be able to respond and complete enrollment (which may include creating an initial supplier user) without having to complete/finalize a user profile to highest level of security.

Suppliers will be enrolled in the electronic payment apparatus post solicitation effort from the buyer. The initial information about the supplier will be provided by the buyer in their MVF. This information may include, but is not limited to:

Supplier Name
Supplier Address and Telephone Number
Tax ID, Site ID and other related information
Other If the supplier chooses to select an acquiring processor, those will be available to them via a drop down menu. When the supplier logs in the system with the provided credentials, they will be required to validate the information in the system and make changes if necessary. A supplier must indicate whether to be public or privately enrolled in the electronic payment apparatus. Public will indicate the supplier may be listed on the public directory, while private indicates only list to his associated buyers. He may change this setting during enrollment with any given buyer and later outside of the enrollment process. Once the supplier has enrolled in the electronic payment apparatus system and has completed all the necessary information—an alert will be sent to the buyer that invited that supplier.

The buyer will have to log-in in the electronic payment apparatus and confirm that the information for the supplier they solicited is accurate. Once the confirmation is executed, a link between the buyer and supplier will be established and at that point the buyer will be able to execute payments to that supplier and the supplier will be able to receive payments from the buyer. Suppliers will be able to update their profile with the following information:

Company Profile—Name, Address etc.
Acquirer processor, receiving bank, etc.

Suppliers can also choose to stop receiving payments from certain buyers, or add new buyers to their profile. Suppliers and associated buyer users may view a supplier's current company profile, or one previous company profile. Supplier will not be able to change information such as Site ID.

If a buyer wants to add a new SITE ID for a supplier, they have two options:

Run a new MVF process
Execute a private supplier entry

A supplier can specify an effective date for the changes to their profile. The effective date cannot be earlier than the next business day of the day of the change. Any change to a supplier profile will trigger an alert that will go to all the buyers associated with this supplier that are affected by the change. The alert will contain general information that can safely be transmitted via e-mail. The proprietary information will only be available in the electronic payment apparatus.

'Acquirer processor' information for the electronic payment apparatus can be entered into a processor directory, for example, via the electronic payment apparatus implementation specialists. The addition of an electronic payment apparatus participating acquirer company profile will be performed by a technical support user who may add acquirer information including bank name and Interbank Card Association (ICA). The electronic payment apparatus program will support the use of a payment processor who will provide the electronic payment apparatus, and other applications, payment processing for multiple acquirers.

During the vendor (supplier) matching process, a supplier's Acquiring ICA (as routed to the data warehouse via the clearing system) will be identified and related to the supplier. If a supplier's ICA as provided by the matching routine is not an electronic payment apparatus participating acquirer, the ICA will be retained as supplier information only. The supplier will also have an opportunity to validate the ICA during enrollment. Identifying the correct acquirer ICA will ensure that STP functions correctly.

EFT Processor

This is the bank that will originate the electronic payment apparatus EFT payments into the ACH network. Appropriate information regarding this payment processor may be stored in the electronic payment apparatus database. End users may view information regarding payments that have been processed through the electronic payment apparatus.

Out of Band Processing

A supplier end user may process a card payment offline, if the supplier has enrolled with a buyer in the electronic payment apparatus and the supplier acquirer is not participating. The supplier must be allowed to see all card information via the electronic payment apparatus system (including full card number). The payment information will be generated from the PIF by the buyer and the appended card information from the electronic payment apparatus.

A supplier may utilize the electronic payment apparatus system to update status for an offline payment. Date and time of status change, and the user making the change, will be tracked. The supplier may enter a failure reason code for an offline payment into the electronic payment apparatus. An offline payment record will have one of the following statuses:

Pending
Failed Auth (optional)
Successful Auth (optional)
Declined payment (returned from payment processor with a decline reason code)
Complete/Approved (payment processor successfully processed)
Technical Failure (payment processor did not successfully process due to a technical issue).

Process Payment Files and Records—Straight Through Payment (STP)

Straight through processing of payments is an automated process initiated from the buyer ERP system that results in a deposit in the supplier account. Unlike the off-line processing—neither the supplier nor the buyer will have any capability to modify the payment in the electronic payment apparatus. Any modifications by the buyer must be done through re-submission of the payment through the buyer's ERP system.

View Payment Information

Information for each payment will be available online for a period of, e.g., 2 years. The information will not contain any proprietary information (i.e. card number will be masked). Users may be given the ability to search payments by search parameters. The following search parameters will be provided:

Payment id
Payment settlement date range (date is between start and end dates)
Payment amount range (minimum to maximum)
Status (one status at a time if one selected)
Card account number (optional)—The displayed results will show masked card number (Only stars and the last four digits—e.g. **--**-1234)
Supplier—Search by Buyer
Buyer—Search by Supplier
Invoice number—Buyer
PO number—Supplier
Check ID The search results list (payment summary table/results list) will be displayed to the user based on a system default of equal to or greater than today's date (system date), or returned to the user based on specific search parameters entered by the user. The payment summary table/results list will have the ability to be sorted by all column headings.

Users may select to view/print payment details for a selected payment from the summary list. The data fields available for viewing/printing include but are not limited to:

Buyer Name
Card number (If Applicable)*
Supplier Name
DDA (If Applicable)[1]
Tax ID*
Site ID
Invoice number—Buyer
PO number—Supplier
Check ID
Payment Method
Payment status
Payment date
Transaction amount

*Note: These fields will be masked to show only*** and the last 4 digits
[1]Note: This field will be available only to suppliers and, in this example, not to buyers Some additional capabilities in the view include:
A supplier user may filter payments by buyer.
A buyer user may filter payments by suppliers.
Export of payment summary table/results list will be in default sort order—by date and time of transaction—descending.
User may search for payments and select all search results or individual results for exporting.

The electronic payment apparatus will provide end-users with various views to access and manage their payments and vendor information. These views include:

Online Views—End-user will be presented with certain information screens for the various tabs within the portal. Examples of tabs would be payment center, suppliers, administration, etc. End-users will be able to change their views by changing date ranges or reordering columns. The electronic payment apparatus will provide a default set of date ranges and categorization by view. End-users will navigate through by clicking on links embedded in table/reports.

Online Searches—End-user can identify and group payments and supplier information by using search criteria.

Pre-defined ("Canned") Reports End-users of the Portal will require specific reports be generated to help them reconcile or analyze the same data for given timeframes.

Dashboard—An online view that (1) provides links to timely information for quick access, such as alerts, and (2) aggregates data from other parts of the electronic payment apparatus for informational purposes, such as number of suppliers that completed enrollment in the last week.

Figure 13:
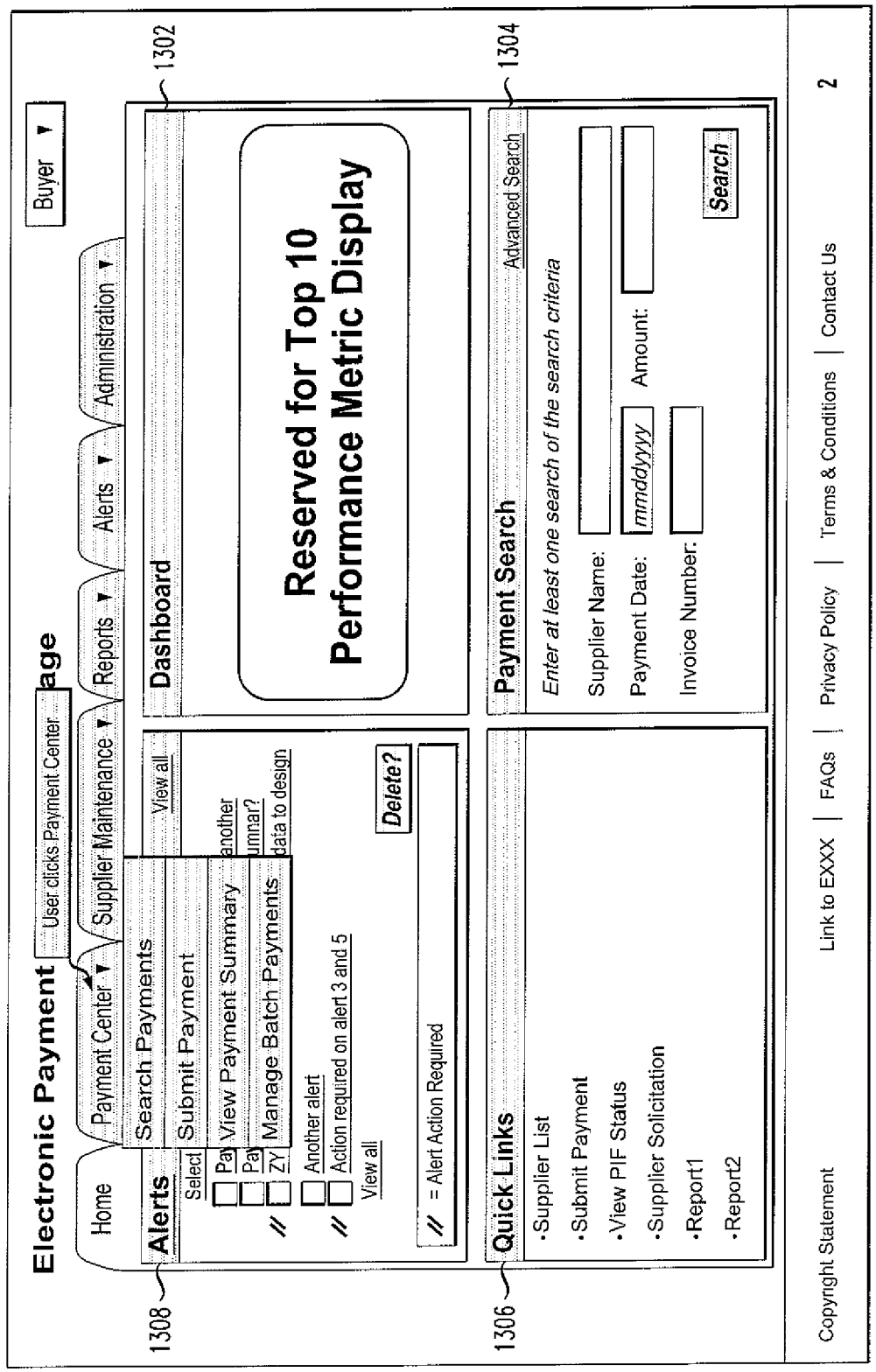
Figure 15:
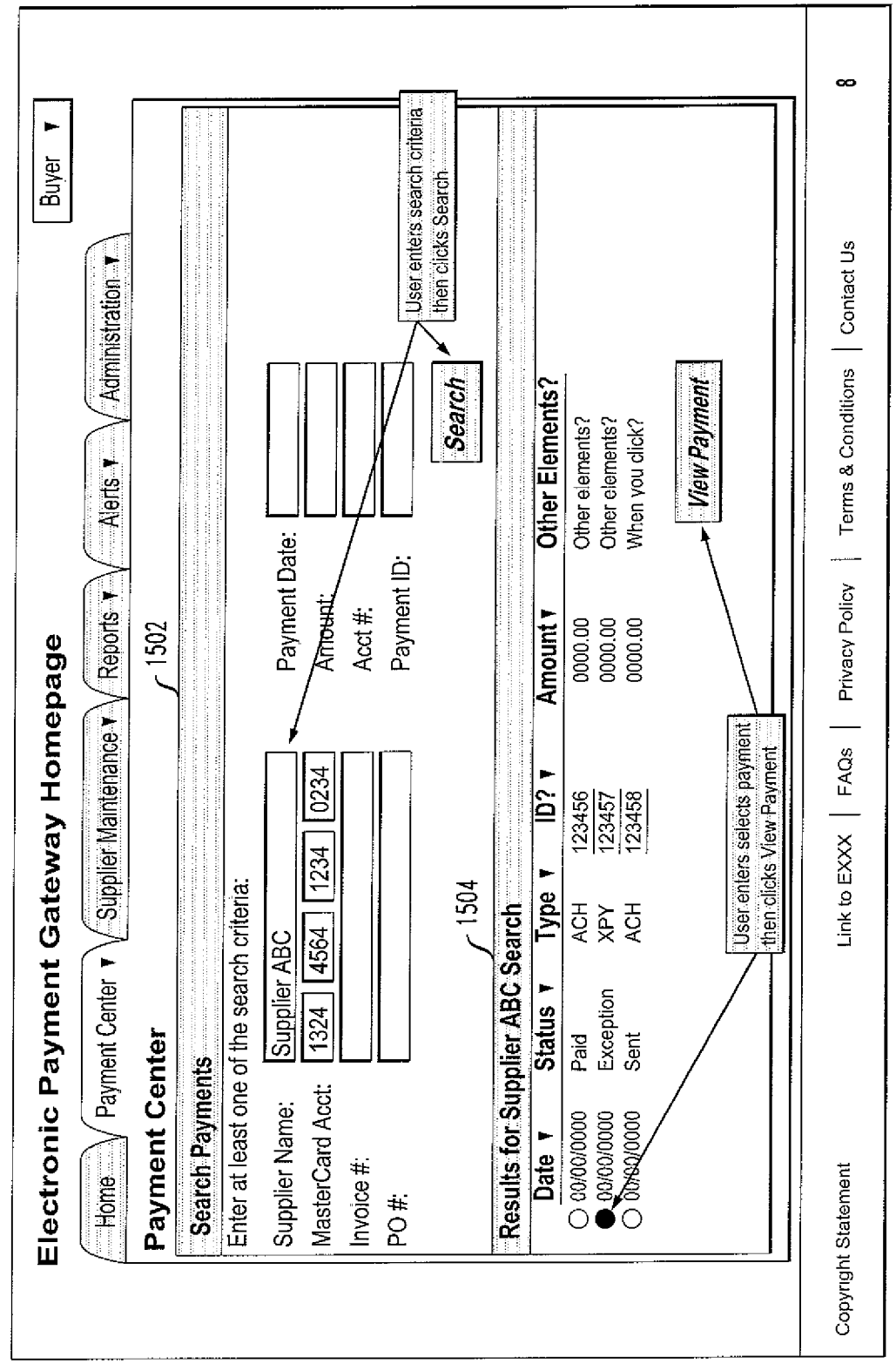

FIG. 13 shows a sample Dashboard—End-user entry page, including Dashboard 1302, Payment Search 1304, Quick Links 1306, and Alerts 1308. FIG. 14 shows a sample Buyer Online View—Payment Summary, including the date, batch/supplier, ID, and amount as shown in the labeled columns. FIG. 15 shows a sample Search Payments View, including search criteria 1502 and results 1504.

Appropriate alerts and email notifications can be executed by the electronic payment apparatus system. As email is not a guaranteed distribution channel, the electronic payment apparatus will also support on line notifications (called alerts)—in order to guarantee receipt of the message. End users will access online alerts via the electronic payment apparatus website. Certain email and alert notifications will be on/off configurable by each organization (buyer and supplier); while others will be mandatory with the on/off feature disabled.

Links in emails and alerts may be selected which will transport user to the related system function where the user may take action. When the user selects a link in an email or alert, the user will be navigated to appropriate information/data record(s).

Manage Notifications—Alerts

System alerts will be set to on or off for a system function within a group. Some alerts will be defaulted to "on," and may not be turned off. The system will default alerts to "on" for all predefined groups and associated alerts. System functions may be associated to more than one group. Therefore more than one alert may be created for a given system function that is performed. A specific alert is created for each group to which a system function is associated. Alerts will include the group profile for which the alert was created. Users may select to view all alerts. He may sort alerts by date, category, or group profile. A summary listing will be displayed for viewing. Any user may delete his individual alert. Alerts will be defined within the system as to which system function should cause an alert and which system function will receive an alert. The system functions will be organized for those associated to the business partners' action versus a related business partner action.

Manage Notifications—System E-mails

System e-mails will be set to 'on' or 'off' for each system function within a group. Some e-mails will be defaulted to 'on,' and may not be turned off for any group by any end user. E-mails will be sent to a user via his group assignment.

7—Implementation and Customer Support

This section provides a summary of typical implementation and customer support considerations arising with regard to inventive techniques. The operator of engine 502 can research buyer's A/P system. Implementing a new buyer may include configuration of buyer ERP, MVF uploads, matching, solicitations, and enrolling their suppliers, etc. Testing typically includes all of the processes associated with testing an implementation, and may include validating the inbound file formats, testing connectivity, testing payment processing, etc. Training can include setting up and managing the training for the buyer as well as internal customer support staff. A suitable help desk can handle all of the processes associated with supporting and retaining existing users, including, for example, troubleshooting exceptions, help desk functionality, resetting passwords, etc. A single facilitator is preferably provided as the customer's point of contact.

8—Third Party Network Integration

Figure 16:
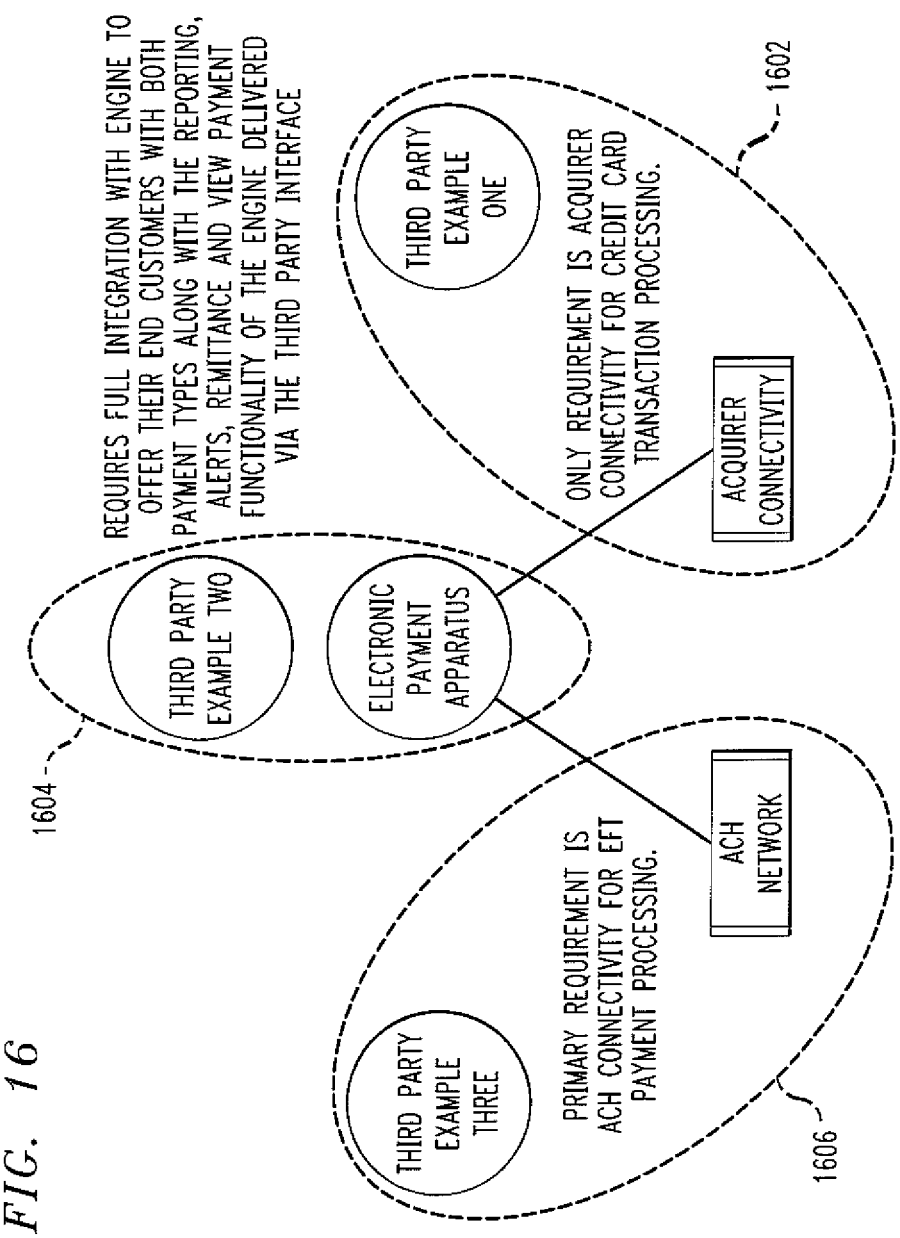
FIG. 16 depicts exemplary third party interactions.

Reference should now be had to FIG. 16. Implementation of one or more inventive embodiments may advantageously be undertaken using a multi-channel distribution strategy. This section addresses implementation and distribution via Third Party Network Resellers (e.g., EIPP vendors). An example of a third party network reseller that would be a distributor of the electronic payment apparatus services is an EIPP vendor EIPP vendors provide their end customers (buyer and suppliers) with a number of procure-to-pay and order-to-cash services—including electronic invoicing, electronic purchase orders, and an integrated network to support the exchange of these documents. Such vendors can be given the option of 'plugging in' to the engine 502 in order to expand their services to include electronic payment processing. By doing so, these vendors can increase these value proposition to their customers as well as share in the revenue associated with processing electronic payments. The level of effort required to integrate a third party network will vary based upon the specifics of each implementation. Different third party vendors will require and/or desire different services. With continued reference to FIG. 16, examples include (but are not limited to):

Acquirer Connectivity Only. In this scenario, number 1602 in FIG. 16, the third party network wants to plug in to the electronic payment apparatus in order to connect into acquirers for P-Card processing only. Impacts to the buyer's interface will depend on the amount of extra electronic payment apparatus functionality (e.g., reports, view payment, alerts, etc.) they wish to expose to their end customers. One non-limiting example of this scenario might be an interface to a disburser software application or to a provider of electronic document management services, such as EIPP.

Full Integration: The third party network, number 1604 in FIG. 16, wishes to expose all functionality of the electronic payment apparatus to their end customers—both buyers and suppliers. This would include both payment options as well as all of the electronic payment apparatus value added services.

EFT Connectivity Only: The third party network, number 1606, wants to plug into the electronic payment apparatus in order to connect to a network of originators for EFT payment processing only. Again, modifications to the third party interface will depend upon the level of extra functionality (e.g., reports, view payment, alerts, etc.) that they wish to expose to their end users.

In one or more embodiments, the end users (buyers and/or suppliers) will allow access to the electronic payment apparatus services via their existing third party interface. The objective/requirement is to eliminate the need for third party end users (buyers/suppliers) to have to log on to a completely separate electronic payment apparatus application in order to conduct electronic payment apparatus functions.

Figure 17:
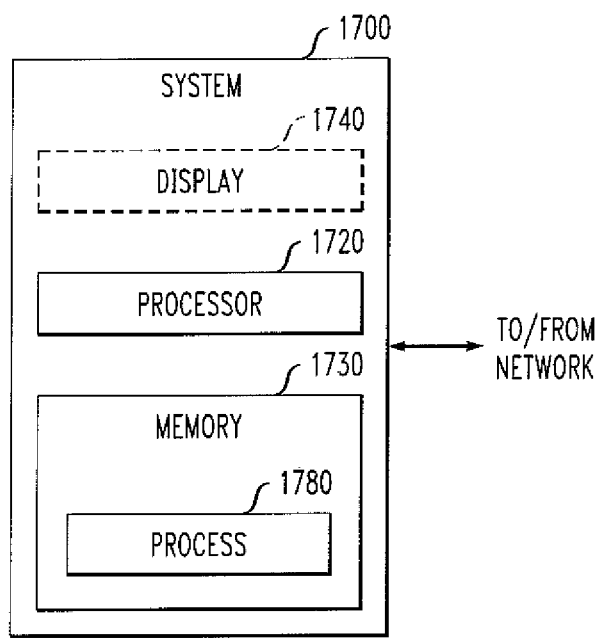
FIG. 17 is a block diagram of a computer system useful in practicing one or more aspects of the invention.

The invention can employ hardware and/or software aspects. Software includes but is not limited to firmware, resident software, microcode, etc. FIG. 17 is a block diagram of a system 1700 that can implement part or all of one or more aspects or processes of the present invention (for example, engine 502 and associated databases and data warehouse(s) and registries). As shown in FIG. 17, memory 1730 configures the processor 1720 to implement one or more aspects of the methods, steps, and functions disclosed herein (collectively, shown as process 1780 in FIG. 17). The memory 1730 could be distributed or local and the processor 1720 could be distributed or singular. The memory 1730 could be implemented as an electrical, magnetic or optical memory, or any combination of these or other types of storage devices. It should be noted that if distributed processors are employed, each distributed processor that makes up processor 1720 generally contains its own addressable memory space. It should also be noted that some or all of computer system 1700 can be incorporated into an application-specific or general-use integrated circuit. For example, one or more method steps could be implemented in hardware in an ASIC rather than using firmware. Display 1740 is representative of a variety of possible input/output devices.

System and Article of Manufacture Details

As is known in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to lead instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein. Accordingly, it will be appreciated that one or more embodiments of the present invention can include a computer program comprising computer program code means adapted to perform one or all of the steps of any methods or claims set forth herein when such program is run on a computer; and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for electronic payment, comprising the steps of:

obtaining, by an entity, a single payment file from a buyer, said single file comprising data specifying both: (i) a first form of payment from said buyer to a first biller and (ii) a second form of payment, different than said first form of payment, from said buyer to a second biller, said entity being separate from said buyer, said first biller, and said second biller, said entity obtaining said single payment file by receiving said file using a hardware processor;

appending by said entity, first stored data, from said supplier registry, to said data specifying said first form of payment to said first biller, to effectuate payment to said first biller by said first form of payment, said appending of said first stored data being carried out by said hardware processor; and appending, by said entity, second stored data, from said buyer registry, to said data specifying said second form of payment to said second biller, to effectuate payment to said second biller by said second form of payment, said appending of said second stored data being carried out by said hardware processor.

2. The method of claim 1, wherein:
said entity obtains said single payment file by receiving said file using a payment server module, embodied on a non-transitory tangible computer readable recordable storage medium, executing on said hardware processor;
said entity appends said first stored data using a transaction engine module, embodied on said non-transitory tangible computer readable recordable storage medium, executing on said hardware processor; and
said entity appends said second stored data using said transaction engine module, embodied on said non-transitory tangible computer readable recordable storage medium, executing on said hardware processor.

3. The method of claim 2, further comprising the additional step of generating remittance information associated with said payment to said first biller and said payment to said second biller, said generating of said remittance information being carried out by said transaction engine module executing on said hardware processor.

4. The method of claim 3, wherein at least a portion of said payment file originates in a payables system of said buyer.

5. The method of claim 4, wherein:
said payment to said first biller is associated with a first account payable between said first biller and said buyer;
said payment to said second biller is associated with a second account payable between said second biller and said buyer; and
said portion of said payment file is formed, at least in part, from data in said payables system associated with said first account payable and said second account payable.

6. The method of claim 5, wherein:
said distinct software modules further comprise a portal module;
said second form of payment comprises a card-based technique;
said first form of payment comprises an electronic funds transfer (EFT) technique;
said first stored data comprises routing and account number information for a bank associated with said first biller;
said second stored data comprises a card account number and expiration date of a payment card account of said buyer;
said remittance information comprises first remittance information associated with said payment to said first biller and second remittance information associated with said payment to said second biller;
said data specifying said first form of payment comprises:
an identification of said buyer;
an identification of said first biller;
an amount of said first payment; and
reference data associated with an underlying transaction for said first payment;
said data specifying said second form of payment comprises:
an identification of said buyer;
an identification of said second biller;
an amount of said second payment; and
reference data associated with an underlying transaction for said second payment;
further comprising the additional steps of:
pre-registering said buyer, said first biller, and said second biller, using said portal module, to obtain said first stored data and said second stored data;
dispatching said first remittance information associated with said payment to a destination associated with said first biller, said dispatching of said first remittance information being carried out by said transaction engine module executing on said hardware processor; and
dispatching said second remittance information associated with said payment to a destination associated with said second biller, said dispatching of said second remittance information being carried out by said transaction engine module executing on said hardware processor.

7. The method of claim 6, wherein said entity comprises an operator of a credit-card type payment network, which also operates said transaction engine module.

8. The method of claim 2, wherein said data specifying said first form of payment comprises at least an amount of said first payment, and wherein said data specifying said second form of payment comprises at least an amount of said second payment.

9. The method of claim 3, wherein said remittance information comprises first remittance information associated with said payment to said first biller and second remittance information associated with said payment to said second biller, further comprising the additional steps of:
dispatching said first remittance information associated with said payment to a destination associated with said first biller, said dispatching of said first remittance information being carried out by said transaction engine module executing on said hardware processor; and
dispatching said second remittance information associated with said payment to a destination associated with said second biller, said dispatching of said second remittance information being carried out by said transaction engine module executing on said hardware processor.

10. The method of claim 9, wherein said destination associated with said first biller comprises a third party representative of said first biller and said destination associated with said second biller comprises said second biller.

11. The method of claim 9, wherein said dispatching said first remittance comprises e-mailing a remittance file.

12. The method of claim 9, wherein said dispatching said first remittance comprises posting a remittance file.

13. The method of claim 3, wherein:
said second form of payment comprises a card-based technique; and
said first form of payment comprises an electronic funds transfer (EFT) technique.

14. The method of claim 13, wherein said card-based technique is carried out via an acquirer.

15. The method of claim 13, wherein said EFT technique is carried out via an originator.

16. The method of claim 13, wherein said data specifying said first form of payment comprises:
an identification of said buyer;
an identification of said first biller;
an amount of said first payment; and
reference data associated with an underlying transaction for said first payment.

17. The method of claim 16, wherein said entity comprises a payment service operator and wherein said identification of said first biller is assigned by a party other than said payment service operator.

18. The method of claim 17, wherein said identification of said first biller is assigned by said buyer.

19. The method of claim 16, wherein said data specifying said first form of payment further comprises an identification of a debit account of said buyer.

20. The method of claim 19, wherein said first stored data comprises routing and account number information for a bank associated with said first biller.

21. The method of claim 16, wherein said data specifying said first form of payment further comprises an explicit indication that said EFT technique is to be used.

22. The method of claim 16, further comprising the additional step of determining that said EFT technique is to be used based on said identification of said first biller, said determining that said EFT technique is to be used being carried out by said transaction engine module executing on said hardware processor accessing said supplier registry.

23. The method of claim 13, wherein said data specifying said second form of payment comprises:
an identification of said buyer;
an identification of said second biller;
an amount of said second payment; and
reference data associated with an underlying transaction for said second payment.

24. The method of claim 23, wherein said entity comprises a payment service operator and wherein said identification of said second biller is assigned by a party other than said payment service operator.

25. The method of claim 24, wherein said identification of said second biller is assigned by said buyer.

26. The method of claim 23, wherein said second stored data comprises:
a card account number and expiration date of a payment card account of said buyer; and
an acquiring merchant ID of said second biller.

27. The method of claim 23, wherein said second stored data comprises a card account number and expiration date of a payment card account of said buyer, and wherein said effectuating payment to said second biller comprises making said card account number and said expiration date of said payment card account of said buyer available to said second biller, so that said second biller can initiate a second-biller-initiated transaction.

28. The method of claim 23, wherein said data specifying said second form of payment further comprises an explicit indication that said card-based technique is to be used.

29. The method of claim 23, further comprising the additional step of determining that said card-based technique is to be used based on said identification of said second biller, said determining that said card-based technique is to be used being carried out by said transaction engine module executing on said hardware processor accessing said supplier registry.

30. The method of claim 13, wherein said payment to said second biller comprises:
an authorization step; and
a settlement step.

31. The method of claim 3, wherein said payment file comprises a first payment file, said buyer comprises a first buyer, and said remittance information comprises first buyer remittance information, further comprising the additional steps of:
obtaining, by said entity, a second single payment file from a second buyer, said second single file comprising data specifying both: (i) said first form of payment from said second buyer to a third biller and (ii) said second form of payment from said second buyer to a fourth biller, said entity being separate from said second buyer, said third biller, and said fourth biller, said entity obtaining said single payment file by receiving said file using said payment server module executing on a hardware processor;
appending, by said entity, third stored data, from said supplier registry, to said data specifying said first form of payment to said third biller, to effectuate payment to said third biller by said first form of payment, said appending of said first stored data being carried out by said transaction engine module executing on said hardware processor;
appending, by said entity, fourth stored data, from said buyer registry, to said data specifying said second form of payment to said fourth biller, to effectuate payment to said fourth biller by said second form of payment, said appending of said second stored data being carried out by said transaction engine module executing on said hardware processor; and
generating second buyer remittance information associated with said payment to said third biller and said payment to said fourth biller, said generating of said second buyer remittance information being carried out by said transaction engine module executing on said hardware processor.

32. The method of claim 31, wherein said first payment file and said second payment file are in a uniform format.

33. The method of claim 31, wherein said first payment file and said second payment file are in different formats.

34. The method of claim 3, wherein said distinct software modules further comprise a portal module, further comprising the additional step of pre-registering said buyer, said first biller, and said second biller, using said portal module, to obtain said first stored data and said second stored data.

35. The method of claim 34, wherein said step of pre-registering comprises the sub-steps of:
receiving a master vendor file from said buyer, said master vendor file including name and address information for said first biller and said second biller;
appending payment-related information for said first biller to said name and address information for said first biller to obtain augmented first biller information;
appending payment-related information for said second biller to said name and address information for said second biller to obtain augmented second biller information;
prompting said first biller and said second biller to perform at least one of verifying and updating said augmented first biller information and said augmented second biller information, respectively; and
storing said augmented first biller information and said augmented second biller information in said supplier registry, said supplier registry comprising a supplier registry database.

36. The method of claim 35, further comprising the additional steps, performed with said portal module, of:
obtaining of buyer profile, payment card and electronic fund transfer information; and
storing said buyer profile, payment card and electronic fund transfer information in said buyer registry, said buyer registry comprising a buyer registry database.

37. The method of claim 36, further comprising the additional step of repeating (i) said pre-registration sub-steps, (ii) said step of obtaining of buyer profile, payment card and electronic fund transfer information, and (iii) said step of storing said buyer profile, payment card and electronic fund transfer information in said buyer registry database, for a plurality of additional buyers and additional billers.

38. The method of claim 35, wherein said step of pre-registration further comprises the additional sub-step of said buyer updating a payable system of said buyer, based at least in part on said at least one of verifying and updating said augmented first biller information and said augmented second biller information.

39. The method of claim 35, further comprising the additional steps of:
- matching selected fields from said master vendor file against data in a data warehouse; and
- based on said matching of said selected fields, providing biller-enablement recommendations to said buyer.

40. A method for electronic payment, comprising the steps of:
- obtaining, by an entity, a single payment file from a third party provider who has received purchase order data from a buyer, first invoice data from a first biller, and second invoice data from a second biller, said single file comprising data specifying both: (i) a first form of payment from said buyer to a first biller and (ii) a second form of payment, different than said first form of payment, from said buyer to a second biller, said entity being separate from said third party provider, said buyer, said first biller, and said second biller, said entity obtaining said single payment file by receiving said file using a hardware processor;
- appending, by said entity, first stored data, from said supplier registry, to said data specifying said first form of payment to said first biller, to effectuate payment to said first biller by said first form of payment, said appending of said first stored data being carried out by said hardware processor;
- appending, by said entity, second stored data, from said buyer registry, to said data specifying said second form of payment to said second biller, to effectuate payment to said second biller by said second form of payment, said appending of said second stored data being carried out by said hardware processor; and
- generating remittance information associated with said payment to said first biller and said payment to said second biller, said generating of said remittance information being carried out by said hardware processor.

41. The method of claim 40, wherein:
- said entity obtains said single payment file by receiving said file using a payment server module, embodied on a non-transitory tangible computer readable recordable storage medium, executing on said hardware processor;
- said entity appends said first stored data using a transaction engine module, embodied on said non-transitory tangible computer readable recordable storage medium, executing on said hardware processor;
- said entity appends said second stored data using said transaction engine module, embodied on said non-transitory tangible computer readable recordable storage medium, executing on said hardware processor; and
- said remittance information is generated by said transaction engine module executing on said hardware processor.

42. The method of claim 41, wherein said data specifying said first form of payment comprises at least an amount of said first payment, and wherein said data specifying said second form of payment comprises at least an amount of said second payment.

43. A computer program product comprising a non-transitory tangible computer readable recordable storage medium including computer usable program code for electronic payment, said computer program product including:
- first computer usable program code for obtaining, by an entity, a single payment file from a buyer, said single file comprising data specifying both: (i) a first form of payment from said buyer to a first biller and (ii) a second form of payment, different than said first form of payment, from said buyer to a second biller, said entity being separate from said buyer, said first biller, and said second biller, said first computer usable program code comprising a payment server module;
- second computer usable program code for appending, by said entity, first stored data to said data specifying said first form of payment to said first biller, to effectuate payment to said first biller by said first form of payment; and
- third computer usable program code for appending, by said entity, second stored data to said data specifying said second form of payment to said second biller, to effectuate payment to said second biller by said second form of payment, said second and third computer usable program code comprising a transaction engine module.

44. The computer program product of claim 43, wherein said data specifying said first form of payment comprises at least an amount of said first payment, and wherein said data specifying said second form of payment comprises at least an amount of said second payment.

45. An apparatus for electronic payment, said apparatus comprising:
- a non-transitory tangible computer readable recordable storage medium embodying:
  - distinct software modules comprising:
    - a transaction engine module; and
    - a payment server module;
  - a buyer registry; and
  - a supplier registry;
- a memory; and
- at least one processor coupled to said memory, said at least one processor being operative to:
  - obtain, by said entity, a single payment file from a buyer, said single file comprising data specifying both: (i) a first form of payment from said buyer to a first biller and (ii) a second form of payment, different than said first form of payment, from said buyer to a second biller, said entity being separate from said buyer, said first biller, and said second biller, said entity obtaining said single payment file by receiving said file using said payment server module executing on said at least one processor;
  - append, by said entity, first stored data, from said supplier registry, to said data specifying said first form of payment to said first biller, to effectuate payment to said first biller by said first form of payment, said appending of said first stored data being carried out by said transaction engine module executing on said at least one processor; and
  - append, by said entity, second stored data, from said buyer registry, to said data specifying said second form of payment to said second biller, to effectuate payment to said second biller by said second form of payment, said appending of said second stored data being carried out by said transaction engine module executing on said at least one processor.

46. The apparatus of claim 45, wherein said data specifying said first form of payment comprises at least an amount of said first payment, and wherein said data specifying said second form of payment comprises at least an amount of said second payment.

47. An apparatus for electronic payment, said apparatus comprising:
- means for an entity obtaining a single payment file from a buyer, said single file comprising data specifying both: (i) a first form of payment from said buyer to a first biller and (ii) a second form of payment, different than said first form of payment, from said buyer to a second biller, said entity being separate from said buyer, said first biller, and said second biller;
- means for said entity appending first stored data to said data specifying said first form of payment to said first biller, to effectuate payment to said first biller by said first form of payment; and
- means for said entity appending second stored data to said data specifying said second form of payment to said second biller, to effectuate payment to said second biller by said second form of payment.

48. The apparatus of claim 47, wherein said data specifying said first form of payment comprises at least an amount of said first payment, and wherein said data specifying said second form of payment comprises at least an amount of said second payment.

49. A method for electronic payment, comprising the steps of:
- obtaining payment instructions associated with a buyer, said instructions comprising data specifying payment from said buyer to at least one of a plurality of billers, said data including an identification number of said at least one biller, said entity obtaining said payment instructions by receiving said instructions using a hardware processor; and
- appending first stored data to said data specifying said payment to said at least one biller, to effectuate payment to said at least one biller, said appending of said first stored data being carried out by said hardware processor;
- wherein said obtaining and appending steps are performed by a payment service operator, said payment service operator being separate from said buyer and said plurality of billers, and wherein said identification number of said at least one biller is assigned by a party other than said payment service operator.

50. The method of claim 49, wherein said identification number of said at least one biller is assigned by said buyer.

51. The method of claim 41, wherein said data specifying said payment comprises at least an amount of said payment.

52. The method of claim 49, wherein:
- said entity obtains said payment instructions by receiving said instructions using a payment server module, embodied on a non-transitory tangible computer readable recordable storage medium, executing on said hardware processor; and
- said appending of said first stored data is carried out by a transaction engine module, embodied on said non-transitory tangible computer readable recordable storage medium, executing on said hardware processor.

* * * * *